(12) United States Patent
Postrel

(10) Patent No.: US 7,742,943 B2
(45) Date of Patent: *Jun. 22, 2010

(54) METHOD AND SYSTEM FOR ISSUING, AGGREGATING AND REDEEMING MERCHANT LOYALTY POINTS WITH AN ACQUIRING BANK

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 1420 days.

This patent is subject to a terminal disclaimer.

(21) Appl. No.: 10/835,550

(22) Filed: Apr. 28, 2004

(65) Prior Publication Data

US 2005/0021401 A1 Jan. 27, 2005

Related U.S. Application Data

(63) Continuation-in-part of application No. 10/608,736, filed on Jun. 27, 2003, now Pat. No. 6,820,061, which is a continuation of application No. 09/602,222, filed on Jun. 23, 2000, now Pat. No. 6,594,640.

(60) Provisional application No. 60/140,603, filed on Jun. 23, 1999, provisional application No. 60/549,451, filed on Mar. 2, 2004.

(51) Int. Cl.
*G06Q 30/00* (2006.01)
(52) U.S. Cl. ..................................... 705/14.3
(58) Field of Classification Search .......... 705/14, 705/39
See application file for complete search history.

(56) References Cited

U.S. PATENT DOCUMENTS 4,941,090 A 7/1990 McCarthy
5,117,355 A 5/1992 McCarthy
5,202,826 A 4/1993 McCarthy
5,592,376 A 1/1997 Hodroff (Continued)

OTHER PUBLICATIONS

Kingson, Jennifer A. "Discover Priorities: Product Mix, Alliances: Shift in Cashback Program, Cobranding." American Banker, p. 1, Jan. 2, 2002.*

(Continued)

*Primary Examiner*—Susanna M Diaz
(74) *Attorney, Agent, or Firm*—Barkume & Associates, P.C.

(57) ABSTRACT

A loyalty reward point system that utilizes the pre-existing infrastructure of network such as a credit card network. A user makes a purchase at a merchant using a token such as a credit card. As part of the purchase transaction, the user is awarded reward points from the merchant based on the purchase, which are stored in an account associated with the merchant and the user by the acquiring bank. The reward account is maintained on the acquiring bank server on behalf of the merchant and the user, and the number of reward points in the user's account for that merchant is increased accordingly. The user may redeem the reward points earned from the transaction with the merchant at a later time, or may redeem the points with another merchant in the same marketing cluster, or may aggregate those reward points with those of other merchants into a reward point exchange account, and then redeem the aggregated reward points for goods or services from any approved merchant on the network, depending on the configuration of the system.

41 Claims, 13 Drawing Sheets

U.S. PATENT DOCUMENTS

| | | | |
|---|---|---|---|
| 5,659,165 A | 8/1997 | Jennings et al. | |
| 5,687,323 A | 11/1997 | Hodroff | |
| 5,689,100 A | 11/1997 | Carrithers et al. | |
| RE36,116 E | 2/1999 | McCarthy | |
| 5,915,244 A | 6/1999 | Jack et al. | |
| 5,956,695 A | 9/1999 | Carrithers et al. | |
| 6,014,635 A | 1/2000 | Harris et al. | |
| 6,327,573 B1 | 12/2001 | Walker et al. | |
| 6,334,108 B1 | 12/2001 | Deaton et al. | |
| 6,379,247 B1 | 4/2002 | Walker et al. | |
| 6,594,640 B1 | 7/2003 | Postrel | |
| 6,721,743 B1 | 4/2004 | Sakakibara | |
| 7,076,465 B1 | 7/2006 | Blagg et al. | |
| 2001/0054003 A1 | 12/2001 | Chien et al. | |
| 2002/0026348 A1* | 2/2002 | Fowler et al. | 705/10 |
| 2002/0029190 A1 | 3/2002 | Gutierrez-Sheris | |
| 2002/0143616 A1* | 10/2002 | Hajdukiewicz et al. | 705/14 |
| 2002/0143626 A1 | 10/2002 | Voltmer et al. | |
| 2002/0188509 A1* | 12/2002 | Ariff et al. | 705/14 |
| 2002/0194068 A1* | 12/2002 | Bishop et al. | 705/14 |
| 2003/0033211 A1* | 2/2003 | Haines et al. | 705/26 |
| 2003/0050831 A1 | 3/2003 | Klayh | |
| 2003/0130895 A1* | 7/2003 | Antonucci et al. | 705/14 |
| 2003/0200144 A1* | 10/2003 | Antonucci et al. | 705/14 |
| 2003/0225618 A1 | 12/2003 | Hessburg et al. | |
| 2003/0236704 A1 | 12/2003 | Antonucci | |
| 2003/0236712 A1 | 12/2003 | Antonucci et al. | |
| 2005/0021457 A1* | 1/2005 | Johnson et al. | 705/39 |
| 2005/0043992 A1* | 2/2005 | Cohagan et al. | 705/14 |
| 2007/0112631 A1* | 5/2007 | Voltmer et al. | 705/14 |

OTHER PUBLICATIONS

Asami, S. "Loyalty Card Utilized as a Marketing Tool in Europe and North America", Card Wave, by C. Media Co., Japan, vol. 10, No. 10, Sep. 10, 1997, pp. 14-20. English Translation.

Wada, F. "Customer Loyalty Programs in America: Latin Pass & Frequency Marketing Inc.", Card Wave, by C. Media Co., Japan, Vo. 11, No. 2, Jan. 10, 1998, pp. 50-52. English Translation.

Kim, W.J. and D.H. Kim "A Method for Exchanging Bonus Points", English Translation of Korean Patent Publication 1999-0078768, May 11, 1999.

Sakakibara, "Method and System for Managing Point, Central Unit and Recording Medium", Machine-generated English translation of Japanese Patent publication JP2001-273453; Oct. 5, 2001, http://www19.ipdl.ncipi.go.jp/PA1/result/detail/main/wAAAZHaGIcDA413273453P1.htm.

Chang, H.J. and K.H Kim "Mileage Point Integration System Based on Internet", English Translation of Korean Patent Publication TUK 2000-0012702, Mar. 6, 2000.

ClickRewards—Member Agreement http://web.archive.org/web/19980516234621/www.clickrewards.com/NSU_b.html.

* cited by examiner

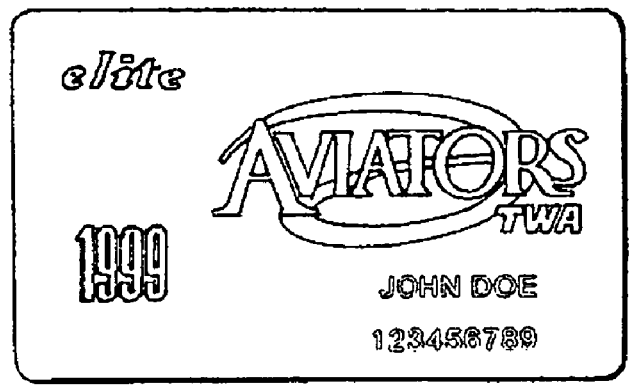
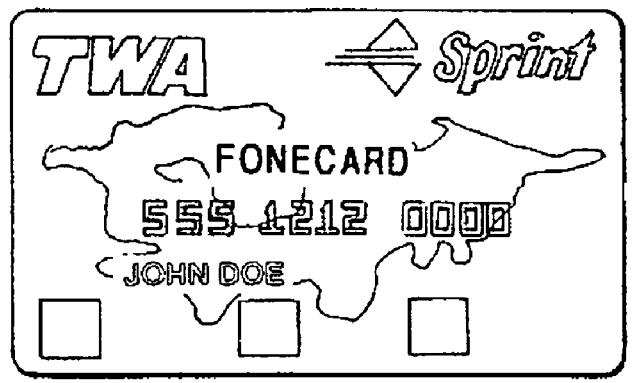
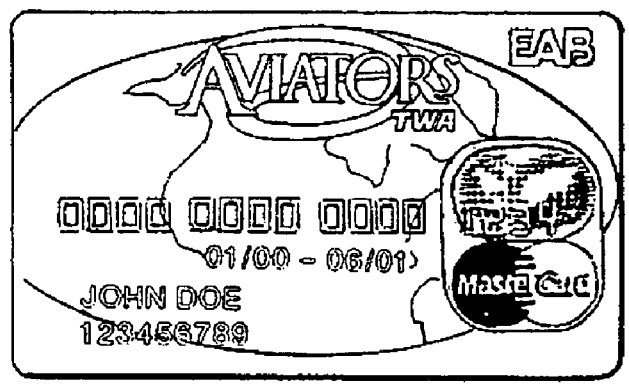
FIG.2
PRIOR ART

Account: John Doe
Account Number: 123456789
Enrollment Date: 12-21-1995
Privilege Card Type: Preferred
Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | | 2300 |
| 05-16-1999 | Flight | LGA | LAX | Y | 801 | | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG.3 PRIOR ART

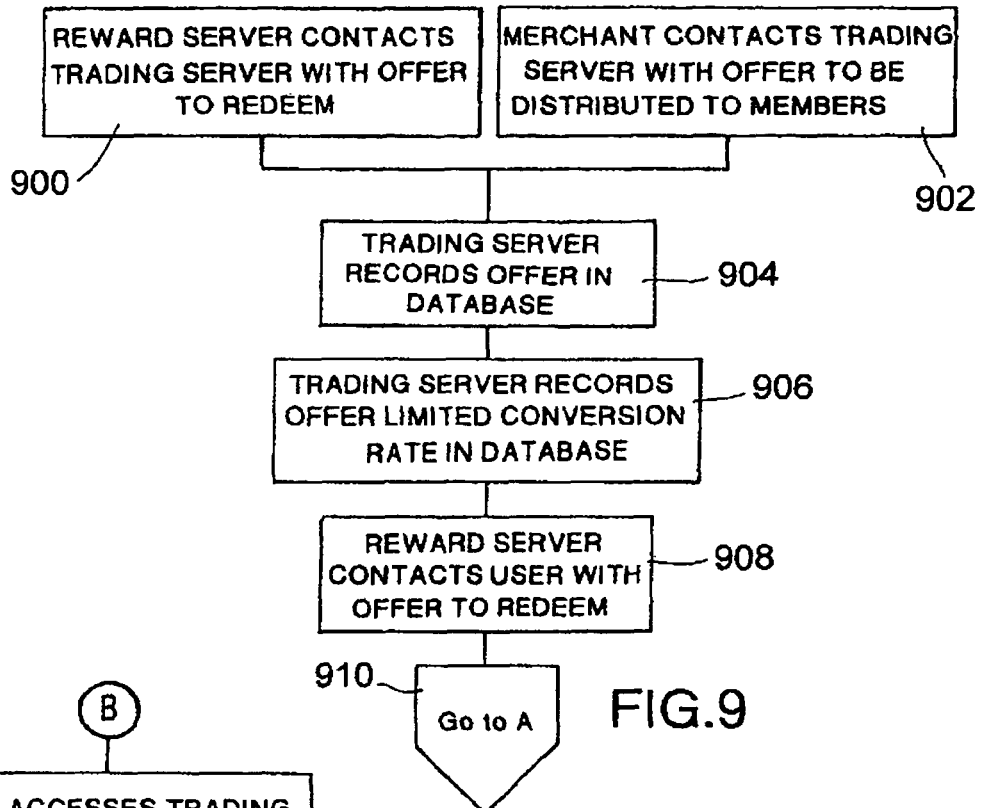
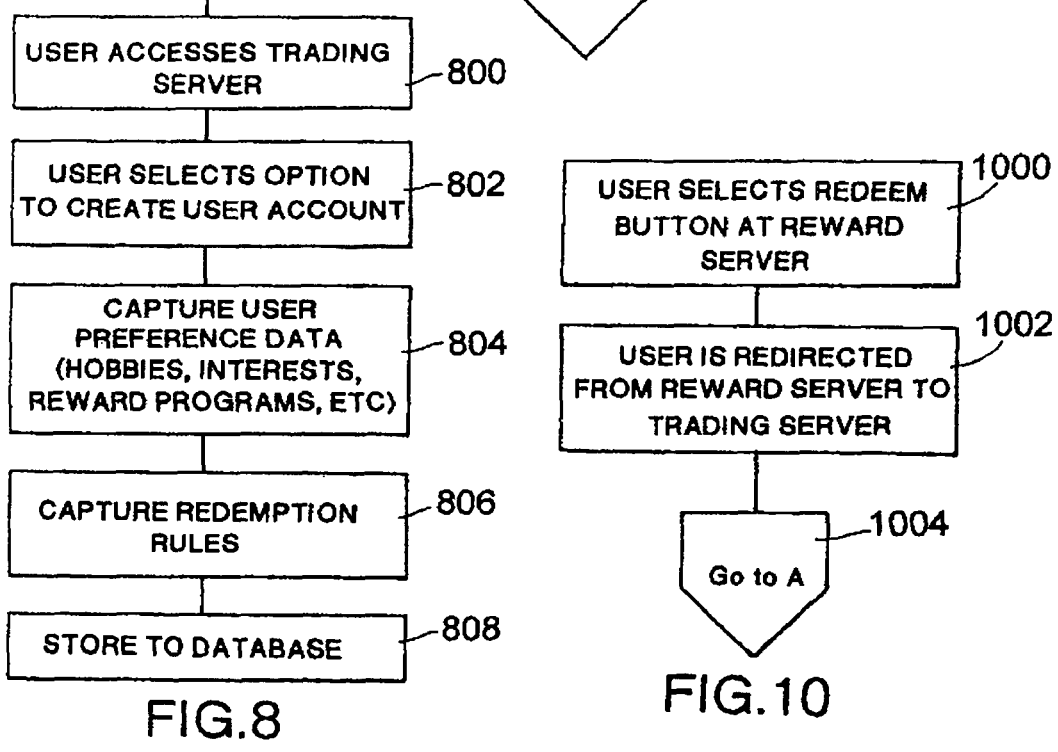

US 7,742,943 B2

METHOD AND SYSTEM FOR ISSUING, AGGREGATING AND REDEEMING MERCHANT LOYALTY POINTS WITH AN ACQUIRING BANK

CROSS-REFERENCE TO OTHER APPLICATIONS

This application is a continuation-in-part application of application Ser. No. 10/608,736, filed on Jun. 27, 2003, now U.S. Pat. No. 6,820,061 which is a continuation of application Ser. No. 09/602,222, filed Jun. 23, 2000, now U.S. Pat. No. 6,594,640, which is based on and claims filing priority of co-pending U.S. provisional patent application Ser. No. 60/140,603, filed on Jun. 23, 1999. This application also claims filing priority of co-pending U.S. provisional patent application Ser. No. 60/549,451, filed on Mar. 2, 2004.

BACKGROUND OF THE INVENTION

This invention relates to loyalty or reward points programs, and in particular to such programs that allow merchants to provide reward points to users wherein the merchants utilize the pre-existing infrastructure of a network such as a credit card network for awarding reward points, maintaining account information of users, aggregating reward points from various merchant-based reward accounts, and redeeming such reward points for products and services selected by the users.

In the prior art, in order to attract and retain business customers, airlines, hotels, car rental companies, chain retailers, telecom providers, etc. have historically introduced frequent use programs that offer awards of loyalty or reward points (e.g. frequent flyer miles) or other such incentives schemes based on the distance traveled or purchases made by that customer. Competition has forced airlines to modify the manner in which mileage was acquired to include travel related purchases by consumers. For example, the dollar-based cost of a ticket purchased may be awarded as mileage to a client account. Within the past several years, banks that issue credit cards or other retailers and e-tailers have co-branded credit cards in the name of the airlines and the credit card company where each dollar spent using the card is recorded as a mile of travel or point in the award program. These cards may additionally award bonus miles in coordination with user purchases of preferred products or flights during preferred times.

With regard to FIG. 1, a model of the frequent flyer systems of the prior art is presented. Two different airlines servers are shown surrounded by their related marketing partners. In order to lure more business travelers, the airlines have established marketing agreements with travel related companies to provide the business traveler with a more robust way to generate rewards in the form of frequent flyer miles. These marketing arrangements or associations have typically involved credit card companies, phone companies, hotel chains and car rental companies. Any purchases made through these co-branded partners were then awarded to the user periodically. Bonus miles or points may additionally be accumulated based on the user's actions in response to offers made by the airline or in coordination with the partner company. For example, phone companies purchase reward points or miles and then offer them to their customers based on the customer's agreement to switch to their phone service. These points are obtained by the partner companies by purchasing them from the issuing entity for redistribution as an incentive to utilize their particular goods and/or services. FIG. 2 shows some sample co-branded cards that are representative of marketing agreements between TWA, Sprint, and Mastercard. In order to receive these benefits, the user must sign up with each of the partner companies separately and provide the frequent flyer account number that is to receive the credited reward points or miles. A user either making phone calls or purchases in accordance with the agreements made with each of these partners will first accumulate a value on the partner's system which in turn is periodically updated on the airline's reward server to reflect the value earned during that period. FIG. 3 is representative of a typical user account that shows various earnings in the system transferred in from any of the co-branded partners. The records of the table in FIG. 3 identify the source of the rewards, the dates they were recorded and the number of miles associated with that transaction. The user can view the accumulated miles by accessing the airline's reward server or by tracking the individual value reported to the user through the various bills the user receives from each of the co-branded partners. In any event, the user is faced with an extremely difficult if not practically impossible task of manually coordinating all of his reward accounts to determine how many points may reside in each account, how to redeem points in each account, etc.

Large scale merchants such as chain hotels, chain rental cars, and various airlines are able to implement their own loyalty or reward points schemes since they have the infrastructure in place to maintain user loyalty point accounts. Thus, these large entitles are able to build brand loyalty via their own loyalty reward schemes. They are able to operate independently by awarding their own reward points and redeeming the reward points by offering their own products and services. A typical example is when a user earns 35,000 American Airlines points and trades them in for a free flight or upgrade, or when a user earns Hilton Honors points by staying at a Hilton hotel, and redeems them for free lodging at a Hilton hotel.

Mid-size and smaller merchants are often unable to implement their own loyalty reward programs due to the high cost of the infrastructure required, including server computers that maintain user reward accounts and administration costs. For example, a small independent restaurant or pizzeria may want to award reward points and allow users to redeem accumulated reward points for free or discounted meals, but is unable to do so due to the aforementioned high costs involved. As mentioned above, some companies have resorted to purchasing reward points or miles from larger companies and then distributing them to their customers, but this does not help build brand loyalty for that company (e.g. MCI gives a customer 5,000 American Airlines points to change to their service, but the customer is not getting MCI-branded points).

It is therefore desired to have a loyalty or reward point program that allows any merchant, regardless of its size, to award their own branded loyalty points and allow users to redeem them for their own products or services in order to build brand loyalty for that merchant. It is also desired to allow users to selectively redeem their reward points at other merchants that are part of the network.

Although the building of brand loyalty by merchants of any size and stature is critical, it is also recognized that users may end up with many different reward point accounts (one for each merchant at which purchases are made), each having relatively small numbers of points. It may take awhile for a user to build a meaningful sum of points with any one merchant, although there are great advantages to both the consumer as well as the merchant in doing so. It is therefore desired to provide a reward point system that allows users to aggregate reward points earned from these various merchants into a reward exchange account, wherein the aggregated reward points may be advantageously used to purchase goods or services from any selected merchant in the system.

SUMMARY OF THE INVENTION

The present invention implements a loyalty or reward point system that utilizes the pre-existing infrastructure of a network such as a typical credit card network (for example the VISA or MASTERCARD credit card networks), and in particular wherein an acquiring bank administers the reward program on behalf of merchants and users. In this embodiment, a user executes a purchase transaction at a merchant using a token such as credit card, a debit card or a smart card (other tokens such as loyalty cards may also be used). In the case of a credit card transaction, the merchant provides purchase transaction information to the acquiring bank with which it has contracted for credit card network services, and as known in the art, will get an approval or decline message after the acquiring bank contacts the issuing bank of the credit card used by the purchaser. Assuming that the purchase transaction is approved, the user is awarded loyalty reward points from the merchant based on the amount of the purchase (e.g. 100 points for a $100 purchase). A reward account is maintained in a database at the acquiring bank on behalf of the merchant and the user, and the number of reward points in the user's account for that merchant is increased accordingly.

The user may redeem the reward points earned from the purchase transaction with the merchant at a later time as part of a redemption purchase transaction, or may redeem the points with another approved merchant on the credit card network, or may aggregate those reward points with those of other merchants into a reward point exchange account, and then redeem the aggregated points for goods or services from any approved merchant on the network, depending on the configuration of the system.

As a result, merchants benefit since they are able to award loyalty reward points based on purchases made by users without having to implement their own infrastructure; i.e. by using the pre-existing infrastructure of the credit card network (in particular an acquiring bank) with which they have a contractual relationship. Users will benefit since they will be provided with merchant loyalty programs previously unavailable to them due to the high cost of setup and administration of such programs.

In particular, banks that are members of a credit card network will see a great benefit under this invention in several ways. As administrators of such a loyalty reward program, banks will be able to participate in each transaction by collecting a transaction fee for the issuance and/or redemption of loyalty points. For example, when a user makes a $100.00 purchase at a merchant under this invention and uses his credit card to pay for the purchase, the issuing bank will typically retain 1.6% of the price, and the acquiring bank will typically retain 0.4% of the price. An acquiring bank that provides the merchant with the ability to record reward points for the user in a log or database under this invention may also retain an additional percentage of the purchase price. The acquiring bank can thus increase revenues for each credit card transaction for which the merchant awards reward points as described herein.

An acquiring bank that provides this service for its users will also benefit from this invention since merchants will have a greater incentive to use the payment services of that acquiring bank rather than those from a competitor acquiring bank that does not have the ability to store merchant loyalty accounts under this invention. That is, if acquiring bank A offers this loyalty program for its merchants and acquiring bank B does not offer this program for its merchants, then a merchant will more likely want to use the services of acquiring bank A since it can provide reward points to its customers for their purchases. This will result in an increase of merchants (and thus revenue) than if the present invention were not implemented.

BRIEF DESCRIPTION OF THE DRAWING

FIG. 2 is a representation of the co-branded partners in a prior art award program;

FIG. 3 is a sample of the prior art reward summary from an airline frequent flyer system;

FIG. 8 is a data flow diagram of the user account creation process on the trading server;

FIG. 9 is a data flow diagram of the offer process by a reward program or by a merchant;

FIG. 10 is a data flow diagram of the process where a user may be redirected from a reward program to the trading server of the present invention;

DETAILED DESCRIPTION OF THE PREFERRED EMBODIMENT

Figure 11:
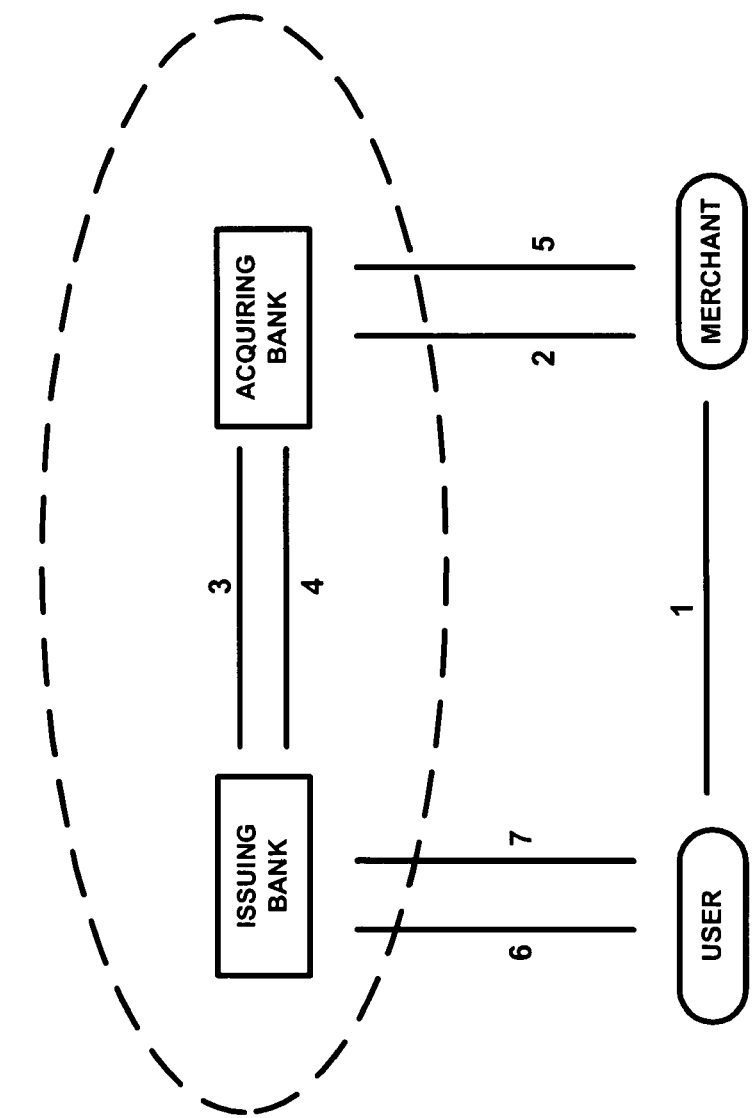
FIG. 11 is an illustration of the process flow in a typical credit card transaction that occurs over a credit card network.

In the preferred embodiment of the present invention, a pre-existing credit card network infrastructure is utilized to provide merchant-branded reward point accounts for users making purchase transactions with those merchants. FIG. 11 illustrates a typical prior art credit card network and a credit card based purchase transaction between a user and a merchant. The credit card network is comprised of thousands of member banks, wherein a member bank may be an issuing bank or an acquiring bank (or it may fulfill the role of both issuer and acquirer). A consumer or user has a contractual relationship with an issuing bank, which will issue the user a credit card such as a VISA card based on finance terms agreed to between the user and the issuing bank. The user will present the credit card when he desires to make a purchase transaction with a merchant (flow 1). The merchant has a contractual relationship with an acquiring bank, which will agree to pay the merchant after the transaction is approved. When the user presents his credit card to the merchant, the merchant will contact its acquiring bank and request approval of the transaction via the credit card network (flow 2). This is typically done by the merchant swiping the credit card into a POS (point of sale) terminal, but it may be done manually (i.e. over the telephone) as well. In addition, e-commerce sales over a global computer network such as the Internet or an interactive television system may be used under this system. Once the acquiring bank has received a transaction request from the merchant, it determines the issuing bank of the credit card (from the credit card information) and then contacts the issuing bank for approval (flow 3). The issuing bank and the acquiring bank are a part of the credit card network, which may have tens of thousand of such member banks. The infrastructure of the credit card network allows for transactions between acquiring banks and issuing banks as described herein as is well known in the art.

Once the issuing bank receives a transaction request from the acquiring bank, it determines if that user has enough credit to allow the purchase. If the purchase is deemed to be allowed by the issuing bank, it sends an approval message to the acquiring bank (flow 4), and the acquiring bank in turn sends an approval message back to the merchant (flow 5). The purchase transaction may then occur. The issuing bank will pay the acquiring bank the amount (i.e. the requested purchase price) minus an interchange fee (e.g. 1.4% of the price). The acquiring bank will pay the merchant the amount received from the issuing bank minus its own fee (e.g. 0.6%). Thus, the merchant will receive the purchase price minus the entire merchant discount of 2%. For a $100 sale, the merchant will receive $98, the issuing bank retaining $1.40, while the acquiring bank retains 60 cents.

The issuing bank will request payment of the full purchase price from the purchaser, typically in a credit card statement that is issued monthly (flow 6). The risk of collection of the purchase price from the consumer is borne by the issuing bank. The user will pay the issuing bank (flow 7), often on a revolving basis with interest attached.

Figure 12:
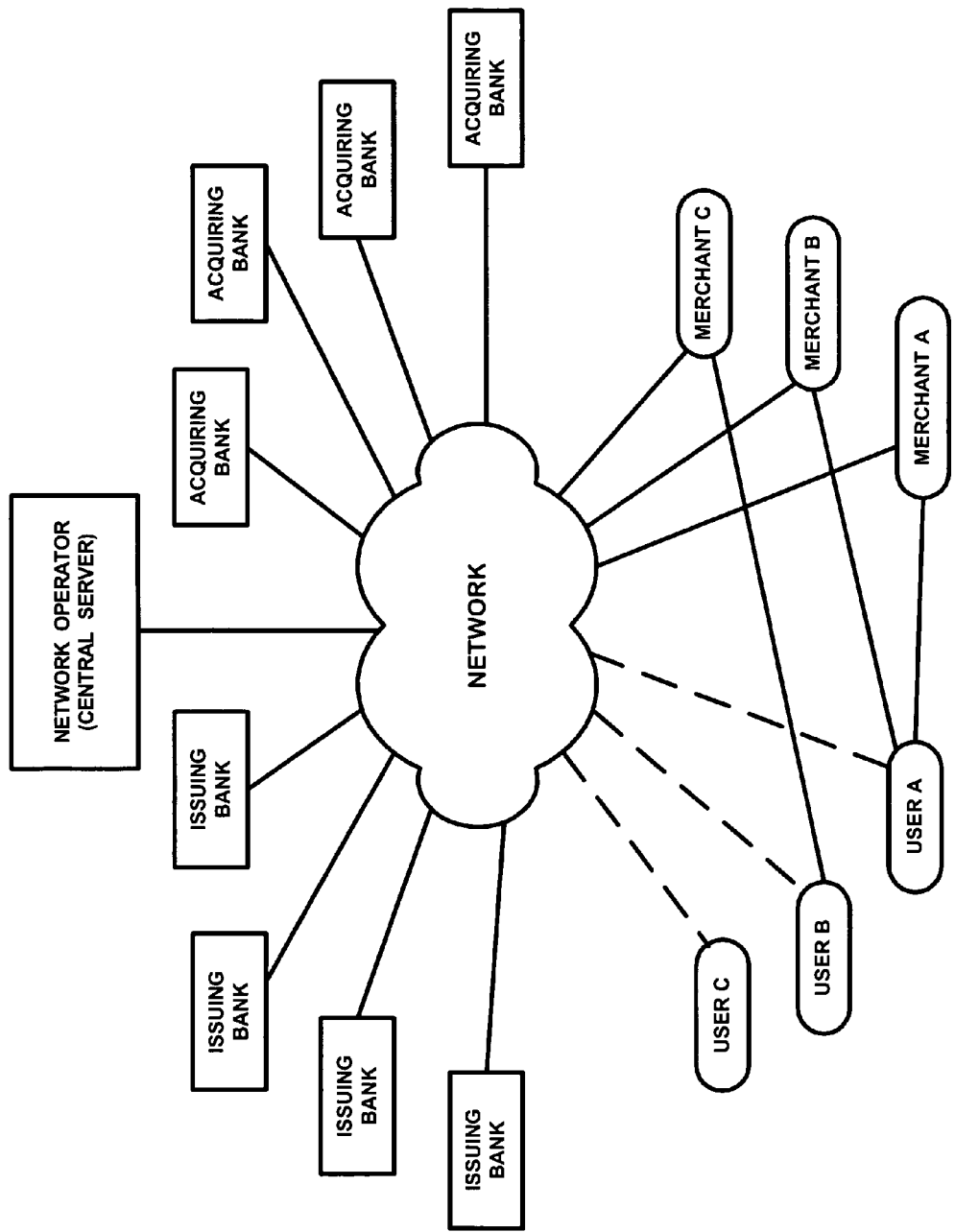
FIG. 12 illustrates a credit card network.

FIG. 12 illustrates a typical credit card network, in which numerous acquiring banks, issuing banks, and merchants intercommunicate with each other as described above via a communications network as shown. FIG. 12 also illustrates how a user typically communicate with merchants directly, but may also interconnect to the network (via the dotted lines) under this invention to interoperate with the user's reward point accounts to check the point balances, control point aggregation, and effect redemption, all as will be described further below.

This type of credit card network thus provides for a merchant to need only one contractual relationship—that with the acquiring bank (and/or the credit card network operator). The merchant is not required to seek payment from the thousands of issuing banks directly—that task is performed as a result of the network architecture. Likewise, the consumer need have only one contractual relationship—that with the issuing bank. The consumer is not required to promise payment to the thousands of acquiring banks directly—that task is performed as a result of the network architecture. These types of credit card networks currently enable over two trillion dollars to be exchanged per year as a result of credit card purchases, and the present day economy would not operate as it does without such networks.

The present invention leverages this pre-existing credit card network and the relationships between member banks to provide for loyalty point accounts and transactions not possible in the prior art due to their high costs if operated independently as done by large entities such as airlines and hotel chains. In this invention, the merchant is desirous of awarding loyalty or reward points to a purchaser for the purchase of its products or services. The merchant wants to award reward points that are directly branded by that merchant, rather than having to purchase reward points from a larger entity such as an airline and distribute them to their customer as in the prior art. In this invention, the merchant will leverage the account with the acquiring bank that it already has a contractual relationship with for purposes of the credit card network by providing purchase transaction information to the acquiring bank, as part of the credit card purchase transaction previously described, so that the purchaser who presented the credit card will receive loyalty or reward points based on the transaction at a predetermined rate, such as one point per dollar spent, which will be stored at the acquiring bank. For example, for a $100 purchase, the purchaser will receive 100 points in an account under his name (or other identification indicia—likely his credit card account number). The merchant may inform the purchaser that he has received 100 of that merchant's reward points based on the transaction. In fact, the merchant will likely advertise that he is awarding reward points under his brand for purchases made at his store. For example, an electronics store such as BEST BUY will advertise that a $100 purchase will yield 100 "BEST BUY Points" for a purchaser. The merchant here is able to provide this feature without having to establish an expensive infrastructure (i.e. sever computers, administrators, etc.) as in the prior art. Likewise, it is able to award its own branded reward points as not seen before in the prior art (rather than simply distributing airline points or hotel points). In addition, the system may be configured so that the acquiring bank (e.g. MBNA or CITIBANK) is co-branded with the local merchant awarding the reward points. Thus, the reward points may be referred to as "BEST BUY/CITIBANK Points", or "BLOCKBUSTER/MBNA Points", or "GAP/FLEET Points", etc.

The merchant is thus able to leverage its pre-existing contractual relationship with the acquiring bank, which will will keep track of the loyalty points awarded by the merchant to all of its customers. Similarly, hundreds or thousands of similar accounts with other customers and merchants will be kept track of in the same manner.

Figure 14:
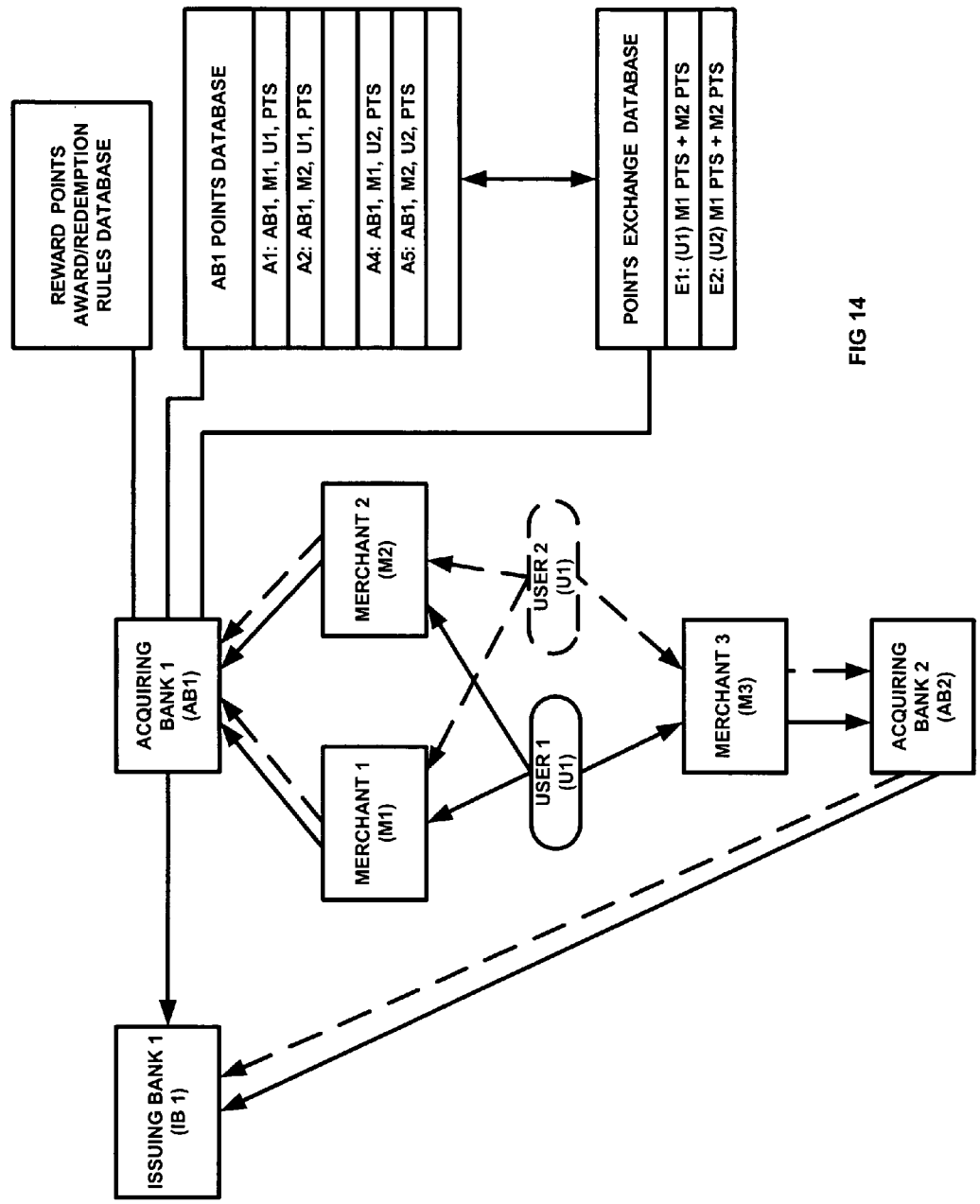
FIG. 14 illustrates the interaction between users, merchants and acquiring banks under this invention.

The maintaining of these merchant loyalty points may be undertaken by storing user and merchant account information in a database associated with the acquiring bank as shown in FIG. 14. Thus, FIG. 14 illustrates a simple database format wherein each merchant and user under that merchant has a record which indicates how many points are in the account, as well as other optional information (such as par value of points, restriction on use, etc.) The format of the storage of the information is unimportant and may take many forms as well know in the art of relational and other types of databases. A simple transaction log may keep information on each transaction processed; this log may be easily modified to include reward point information as well. Thus, there may be a setup fee charged by the acquiring bank to initiate the loyalty reward program for a merchant, as well as transaction fees that provide for a small percentage of revenue to the acquiring bank for each transaction.

The acquiring bank may set up the accounts with each merchant as desired. That is, an acquiring bank such as MBNA may agree with a merchant such as BEST BUY that every time a user purchases an item at BEST BUY, MBNA will allow for a reward point account to be opened and increased for that particular user and for BEST BUY transactions only. In one case, there may be a requirement that a specific instruction be sent from BEST BUY to MBNA (typically as part of the credit card transaction) in order for points to be awarded. Thus, there would be an instruction from BEST BUY to MBNA that User A should have 150 points added to his BEST BUY account managed by MBNA because he made a $150 purchase transaction at BEST BUY with his credit card or other token. Likewise, when User A visits another participating merchant such as BLOCKBUSTER, there may be an instruction sent from BLOCKBUSTER to its acquiring bank that User A should have 30 points added to his BLOCKBUSTER account managed by that acquiring bank because he made a $30 purchase transaction at BLOCKBUSTER with his credit card or other token.

In another case, there may be predetermined rules established and stored in a reward rules database, for example, at the acquiring bank as shown in FIG. 14. These reward rules would control the issuance of reward points to certain users by certain merchants under certain conditions, as set forth in the rules. For example, a rule may be established that would provide for all users to obtain reward points from a merchant based on the particular item purchased by a user (e.g. all users would receive 25 reward points for purchasing a DVD, or all users would receive reward points equivalent to the purchase price for purchasing a particular brand of stereo equipment, etc.) In addition, a rule may be established wherein users would receive reward points from a merchant based on the purchase price of an item (e.g. all purchases over $30 are eligible for points). Also, a rule may be established wherein users are awarded points by merchants only in certain geographic locations (e.g. all BURGER KING outlets in Manhattan are awarding points). Another rule would provide for reward points to be awarded only on certain days or dates, and/or only at certain times of the day (e.g. reward points awarded by STARBUCKS only on weekend during morning hours).

In the case of a rules-based award scenario, specific instructions need not be given for each transaction by the merchant to the acquiring bank to provide reward points to the user. Rather, the acquiring bank will have information provided from the merchant and/or other sources as part of the purchase transaction (such as item purchase, purchase price, location of merchant, and day/date/time of purchase), and will refer to the rules database to determine if reward points should be awarded. In addition to storing the reward rules database at the issuing bank, the reward rules database may be located at a merchant site, or at any associated site.

The user may be able to view his loyalty point account balance for a given merchant by logging into a web site run by the acquiring bank for that merchant. Optionally, the merchant may have a link on its web site so that the user can check his account, or there may be a redirection from the merchant site to the acquiring bank web site, etc. The user may also be able to place a telephone call and, using well known techniques for acquiring information via DTMF tones or audible instructions, obtain account information. The purchaser need not even know that the account is being held for him by the acquiring bank server since it will operate in the "back office" aspect of this invention, thus rendering the specific procedures transparent to the user and providing a great ease of use of the system.

Thus, a purchaser may build up many similar loyalty reward accounts simply by using his credit card for making purchases as he has done so in the past. Since all credit card transactions at any merchant must be processed by the acquiring bank for that merchant, then all of the merchant's reward point accounts—regardless of the user involved—will reside with the same acquiring bank. The system may be configured to not even require a separate "frequent use" account number to be entered at the POS, since this is many times cumbersome for a user. Experience teaches that many users do not even bother with obtaining frequent use or loyalty points (i.e. from major entities such as Hilton Hotels) since the time and effort in opening a separate account, remembering the account number or carrying a separate membership card, remembering their PIN, etc. is simply unmanageable. The system may simply tie in the loyalty account data to the user's credit card number and a merchant ID setup for each merchant.

Although some issuing banks have their own reward point program (such as MBNA's MASTERCARD), these programs award points to a user based on their credit card use at a merchant, but the loyalty reward program inures solely to the benefit of the issuing bank, and not the merchants themselves. That is, a user gets "MBNA points" and obtains the account information on his MBNA statement, but there is no branding or loyalty based on a transaction with a given merchant as in the present invention. Moreover, the present invention provides for redemption of points and aggregation of points in a manner not possible with a prior art issuing bank loyalty program (the items that can be obtained with issuing bank points are quite limited and often render the benefits meaningless).

Under this invention, each purchaser/cardholder enjoys the benefits of being an independent account holder, earning loyalty reward points with every merchant that elects to participate under the system. Likewise, each cardholder may execute a transaction wherein points are purchased from an issuing bank or a merchant, at a discount rate that will provide transaction fees for the points issuer/distributor accordingly. The purchased points may be redeemed, or they may be given to others as a gift, or sold to others, etc. The points have a par value that may increase or decrease. The system may be configured so that there are no restrictions on their transfer (i.e. so that they are fungible and fully transferable).

In any event, a merchant's reward points may be made to be interchangeable with an issuing bank's branded points. Thus, a holder of BEST BUY points may also use any reward points he has independently accrued on his credit card loyalty account (e.g. MBNA Mastercard) to purchase items at BEST BUY.

As previously mentioned, rules may be established with respect to all parties involved—the merchants, the issuing banks, the acquiring banks, and the credit card network operator—regarding earning, aggregating and redeeming loyalty points, which will provide a completely customizable and fluid loyalty point system using an existing credit card network infrastructure.

Although the present invention has been described with respect to the use of a credit card, the invention will operate in the same manner with the use of debit cards or check cards that are becoming popular today. That is, the methodologies employed do not vary significantly when a debit card is used (except that the purchaser's account is debited immediately by the issuing bank rather than billing the purchaser later on) rather than a credit card. The present invention includes the use of such debit cards modified as may be required to operate with the same advantages as herein described.

Likewise, the present invention may be advantageously adapted to provide merchant-based loyalty reward points based on cash transactions as well as the aforementioned credit card and debit card transactions. Cash transactions still make up a substantial portion of purchases, and it would be beneficial for a merchant to provide loyalty points to purchasers using cash in addition to those using credit or debit cards. This will further increase loyalty to that merchant. In this case, the purchaser would still have to present some identification such as his credit card (if the credit card number is being used for unique identification of the purchaser and indicating his loyalty account with the central server). Thus, for example, if a purchaser pays $50 in cash for an item at a store and presents his credit card, the credit card may be swiped at the POS for the sole purpose of awarding him 50 reward points at the acquiring bank server.

In situations where a customer may not be creditworthy, or simply may not want to have any credit cards or debit cards, a "dummy" card may be used as the token that takes the shape and form of a credit card, along with branding by the issuer, and which may have the logo of the credit card network imprinted thereon, but which is not tied to a credit account or a debit account of the user. The card is used to link the user to a reward points account in the same manner that an actual credit or debit card is linked. (In addition, when the user wishes to redeem his loyalty reward points, the points may be utilized for a purchase by presenting the card and swiping it into the POS terminal in a manner similar to a credit card presentation.)

In the present invention, reward points accounts for a user shopping at a merchant may be opened and awarded automatically, or the system may require an enrollment process by the merchant, in which the merchant has the opportunity to capture relevant demographic and other data regarding the users.

Referring to FIG. 14, an example of the present invention will be described. In this simplified scenario, user 1 (U1) purchases products at merchant 1 (M1), merchant 2 (M2), and merchant 3 (M3). Both M1 and M2 happen to use the same acquiring bank 1 (AB1) for processing their credit card transactions. Merchant 3 (M3) uses a different acquiring bank 2 (AB2). As a result of the purchases AB1 and AB2 must transact with issuing bank 1 (IB1), which issued U1's credit card. As a result of his transactions with M1, U1's "M1 Loyalty Points" are stored in account 1 (A1) at AB1. As a result of his transactions with M2, U1's "M2 Loyalty Points" are stored in account 2 (A2) at AB1. And, as a result of his transactions with M3, U1's "M3 Loyalty Points" are stored at AB2 (not shown).

User 2 (U2) also has a credit card issued by IB1, and his transactions with M1, M2 and M3 yield "M1 Loyalty Points" at account 4 (A4) at AB1, "M2 Loyalty Points" at account 5 (A5) at AB1, and "M3 Loyalty Points" at AB2 (not shown).

Each of these accounts A1-A6 represents separate loyalty accounts that U1 and U2 have with each of these merchants individually. For example, A1 may represent U1's loyalty points with BEST BUY; A2 may be his loyalty points with CIRCUIT CITY, and A3 may be his loyalty points with BLOCKBUSTER, all of which were earned as a result of purchase at those merchants with the credit card issued by IB1. U1 and U2 may utilize these loyalty accounts separately for redemption at those or other related merchants, as described below. Either user may aggregate or combine their loyalty reward points into an exchange account for increased purchasing power, also as described below.

Once the purchaser has earned reward points with this invention, he or she may choose to redeem his points in any one of various manners. In one embodiment, the user U1 will execute a redemption purchase transaction with the merchant M1 directly, and indicate that he wishes to utilize his reward points from account A1 to pay for the item in full or in part. For example, the purchaser may want to use 5,000 of his BEST BUY reward points from A1 (worth one cent per point) to reduce the purchase price of an electronics product from $75 to $25. He indicates this to the BEST BUY merchant M1 at the point of sale (which may be over a web site or physically at the store). In the event that he presents his credit card to make his partial payment, then the same approval process takes place as described above. In addition, the purchaser's loyalty account A1 at the merchant's acquiring bank AB1 is reduced by the number of designated points (i.e. 5,000 points). The merchant M1 issues an instruction to the acquiring bank AB1 to reduce the loyalty account A1 accordingly. In this case, the acquiring bank will request approval only of the difference between the redemption purchase price and discount due to the redemption of reward points (i.e. $25 in our example above); the issuing bank IB1 will pay the acquiring bank AB1 $25, and the acquiring bank AB1 will pay the merchant M1 $25 and the acquiring bank AB1 will reduce the appropriate reward point account A1 by 5,000 points (the discounts mentioned above will be also taken by the member banks). As a result, BEST BUY has now provided a very powerful loyalty scheme without any significant investment in infrastructure that would be required had it not used the infrastructure of the member banks of the credit card network. By paying a modest transaction fee (i.e. a chargeback), the merchant has gained significant loyalty power that was heretofore unavailable.

In addition to using a reward point redemption instruction from the merchant to the acquiring bank, a set of redemption rules may be put in place, similar to those described above with respect to points automatically awarded for purchase transactions. Thus, these redemption rules would control the redemption of reward points by certain users at certain merchants under certain conditions, as set forth in the redemption rules. For example, a rule may be established that would provide for all users to redeem reward points with a merchant based on the particular item purchased by a user. In addition, a rule may be established wherein users would redeem reward points with a merchant based on the purchase price of an item. Also, a rule may be established wherein users redeem points with merchants only in certain geographic locations. Another rule would provide for reward points to be redeemed only on certain days or dates, and/or only at certain times of the day.

Reward point issuance and redemption may occur physically at a point of sale, such as a store location, or it may occur online as part of an online purchase transaction. In the case of a physical store, the user would present the token, which in the preferred embodiment is the credit card, to have the merchant award (or redeem) points to his account as identified by the credit card number. Other tokens may be used, such as debit cards, loyalty cards, smart cards, stored value cards, etc. As long as the token has a unique identification number associated with it, that number may be used to identify the user. This of course may be done online as well with methods well known in the art, such as by entering a credit card number as part of a purchase transaction over the Internet. In addition, intangible tokens may be used, such as a user's social security number or a predefined PIN. In the event that the user does not have a credit card, and his SSN is used, then the issuing bank may link the user to his reward account by the SSN (or other PIN) even though a credit transaction does not occur.

Optionally, the system may be configured to provide that merchants may be reward points issuers only (without point redemption), or they may be reward points redeemers only (without point issuance). In the case wherein a merchant elects to be only a point redeemer, rules will be established and stored that will indicate from which other merchant loyalty accounts that merchant will accept and redeem points. When merchant A chooses to accept points that were originally issued by merchant B, then merchant B will provide consideration, via the system, to merchant A as a result of the redemption. Merchant A may only receive a percentage (e.g. 90%) of the purchase price, with the discount being held by the system as a transaction fee. For example, when merchant A sells a product to a purchaser that costs $10, and the purchaser elects to redeem points for the purchase, he must redeem 1,000 points (at one cent per point) that were issued by merchant B. Merchant B will pay $10 into the system in exchange for retiring the points, and merchant A will receive $9 in payment for the item purchased. Merchant B will have acquired a customer, and made an incremental profit on the sale, that it would otherwise not have made if it did not act as a point redeemer under this invention. In the event that merchant A becomes a point issuer as well as a point redeemer, then the discount may decrease to 5%—so that the same transaction as above will result in the merchant A receiving $9.50 rather than $9.00.

In situations where a purchaser attempts to redeem points at a store for the first time (i.e. with that were obtained from a different issuer merchant), the redeeming merchant may elect to provide a bonus opportunity for that purchaser as a reward for using that merchant for redemption. For example, the merchant may provide that the points have an increased value for that particular redemption, or it may provide a purchase price discount, etc.

In addition to redeeming reward points directly with the merchant that awarded the points, the user/purchaser may aggregate reward points from more than one merchant loyalty reward point account to increase his purchasing power. That is, he may have dozens or even hundreds of similar reward accounts with the various merchants with which he does business; such as hardware stores, movie theaters, car washes, video rental stores, gas stations, hotels, airlines, etc. Since any type of merchant that accepts his credit card (or other loyalty token) is empowered with a custom-tailored loyalty program under this invention, there is virtually no limit to the number and type of merchant loyalty accounts that a user may have under this invention.

Figure 15:
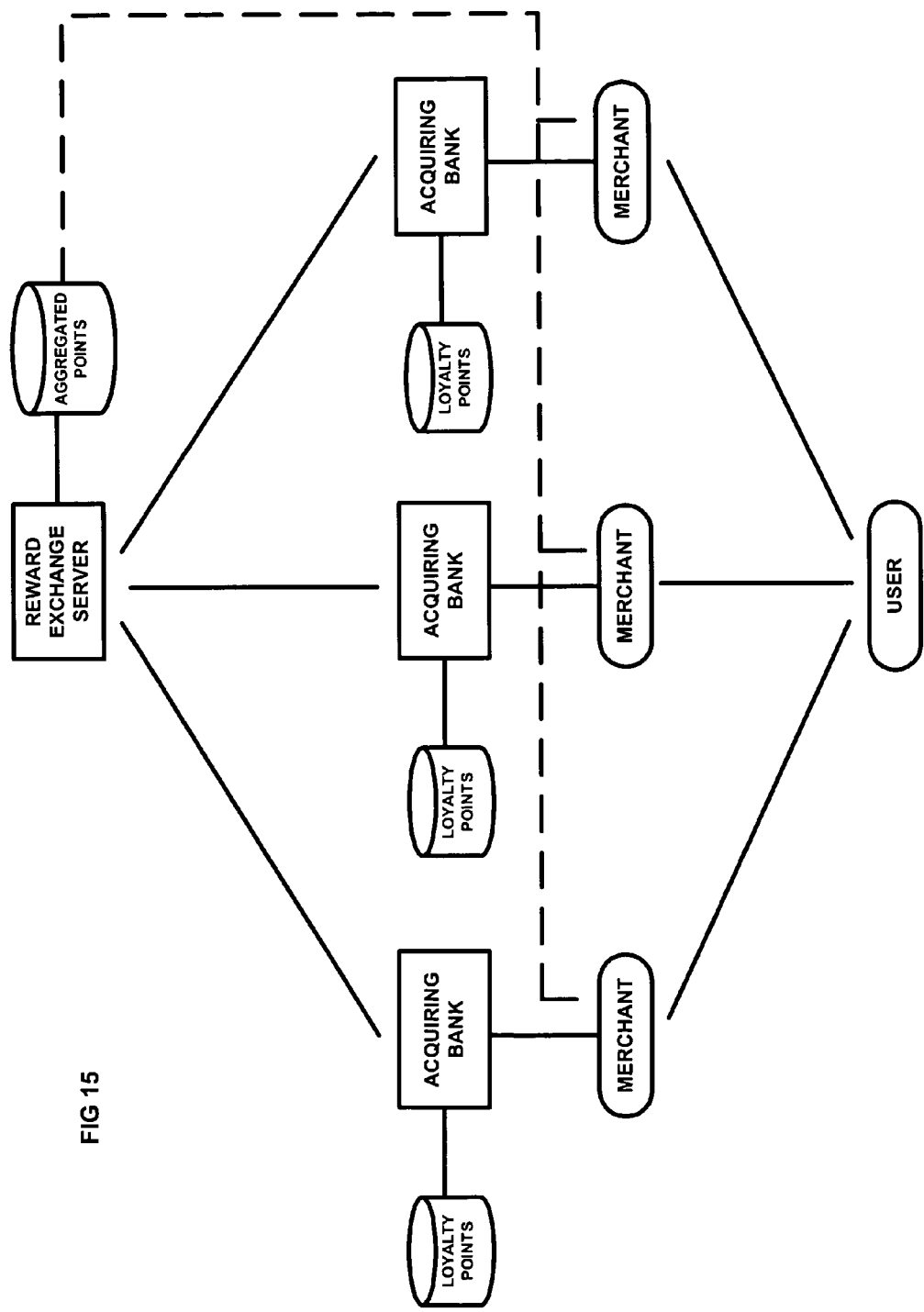
FIG. 15 illustrates an alternative embodiment of a third party points aggregation service.

Loyalty points aggregation is undertaken by an exchange server database, which may be located with any entity on the network (or external to the network and operating on behalf of the network members, as shown in FIG. 15). The reward point exchange server allows a user to view his loyalty points portfolio easily (such as on a web page or in a printed document mailed to the user periodically, e.g. the billing statement), it allows the user to manage the exchange and aggregation of reward points from any of his individual merchant accounts into his reward point exchange account, and it allows the user to execute redemption purchase transactions with his aggregated reward points. For example, if an exchange account is held by an issuing bank, then user U1 may establish a reward point exchange account E1 with his issuing bank (such as CITIBANK) directly, and CITIBANK will use his account number (with appropriate security procedures) to determine all of the reward database records and accounts stored on the various acquiring banks on the network. User U1 will not need to enter dozens or even hundreds of account numbers, since his loyalty reward accounts will be tied directly to his credit card number. Once the reward point exchange server obtains his reward points information from the separate merchant accounts, it will generate a web page to display the account totals to the user. The user can then instruct the reward point exchange server to aggregate reward points into his reward point exchange account from selected merchant accounts as desired. Consideration will be provided from the merchant to the reward point exchange server that correlates to the number of points exchanged. So, for example, if the user requests that 5,000 points be transferred from his BEST BUY merchant reward account A1 to his reward point exchange account E1, then the BEST BUY account A1 will be reduced by 5,000 points. The BEST BUY acquiring bank will invoice the merchant by the reduced amount, which may for example be $30. The user U1 will no longer be able to obtain a direct loyalty discount for those points with the merchant M1 since he has exchanged them into his reward point exchange account E1. (He may still be able to redeem his exchange points from E1 with that merchant M1 as part of a cluster or network-based transaction, described below).

When the purchaser utilizes the reward points exchange server for aggregating his or her loyalty reward points from various merchants, exchange rates may be set wherein the purchaser loses some points or value as a transaction fee based on the exchange. So, for example, the purchaser may only net 3,000 exchange points for the above transaction in which 5,000 merchant points are exchanged. The actual exchange rate and fee structure may be set amongst the merchants, the acquiring bank and the reward points exchange server operator in order to provide a fair compensation scheme for each party while maintaining the benefits of the system, including the building of merchant loyalty and the ability of the consumer to use his reward points in ways heretofore unavailable.

The purchaser may repeat this type of transaction with any or all of his accounts and aggregate them into his reward points exchange account for the purpose of purchasing an item that he may otherwise be unable to obtain with the points aggregation. For example, he may aggregate 3,000 points from one account, 7,000 from another account, and 10,000 points from another to provide a total of 20,000 exchange points in his reward points exchange account. Although the system greatly advantages mid-sized and smaller merchants that have no independent loyalty programs, the consumer may also be able to exchange points from outside the network; i.e. from airlines or hotel chains, into his reward points exchange account.

After the purchaser has aggregated his desired points, he may execute a redemption purchase transaction with those points. In the preferred embodiment, the purchaser may purchase any item at any merchant that accepts his credit card—which will be virtually every merchant. The aggregated loyalty reward points will reduce the purchase price by the number of points surrendered by the purchaser for that transaction. In this case, the merchant may be required to pay a small transaction fee to cover the administrative cost of utilizing aggregated reward points under the invention. The purchaser may pay for all or part of the purchase with aggregated reward points. When the purchaser executes the redemption purchase transaction, the number of designated reward points is taken from the reward points exchange account, and corresponding consideration is transferred to the appropriate merchant (minus a transaction fee). As an option, the transaction fee for a merchant may be lessened or even waived if the purchase is made with loyalty reward points issued by that merchant (as opposed to loyalty reward points from another merchant).

The present invention allows for a transaction executed with reward points to bypass the acquiring and issuing banks and proceed directly with the reward points exchange server, assuming that the user has enough aggregated reward points in his reward points exchange account. In the event that part of the redemption purchase must be made with the credit card, then payment of the balance would be redirected to the acquiring bank and issuing bank as done in the prior art for regular purchases.

In an alternative embodiment, the purchaser may select an item from a catalog of items provided in conjunction with the reward points exchange account. For example, CITIBANK may partner with an entity or entities that can provide to it a catalog of items for sale. The purchaser can easily link to that catalog and make a redemption purchase accordingly.

As previously noted, an issuing bank may fill the role of the reward points exchange server. Once the points have been aggregated by the purchaser, he may make a redemption purchase transaction with any merchant that will accept his credit card. He can indicate that he is making the purchase with aggregated reward points only, with reward points and credit, etc. This may be done easily over a web site if it is an e-commerce transaction, or it may be done at the physical point of sale. In the alternative, the purchaser may simply choose to pay full price at the POS and then reduce his bill from the issuing bank by a corresponding amount of aggregated reward points.

The system of the present invention may be adapted so that the reward points exchange service is located on any computer either within the credit card network or external to the network. As described more fully below, the exchange server needs to be in communication with the computers that store the individual reward points accounts, in order for points aggregation to occur as explained herein. In a preferred embodiment, the purchaser/user is given access to the reward point exchange server, such as by a web page over the Internet, to allow him or her to view the loyalty point account information, aggregated point information, and to effect aggregation of points from one or more individual reward point accounts into the points exchange account as desired.

In one aspect of the invention, the merchant is the entity that essentially funds the administrative costs and overhead of the loyalty program. Thus, the merchant has acquired entry into a powerful loyalty program and robust customer acquisition program in exchange for paying nominal transaction fees on points issuance and/or aggregation and/or redemption against the incremental revenue gained due to the loyalty program. Unlike a network-funded loyalty system, which provides nominal incentives and is highly restrictive with no meaningful awards obtainable, the present invention eliminates restrictions if desired and provides a broad-based points issuance, aggregation and redemption network.

As a result of providing loyalty points to different users, a merchant will have many loyalty points accounts stored in its acquiring bank. A merchant may thus easily view his total points that have been awarded to various users at the acquiring bank. Thus, merchant bank can monitor and be aware of its outstanding loyalty points.

It is known in the prior art that a debit card may be used to access a user's account to make a purchase in one of two ways; either by a PIN based transaction or by a signature based transaction. Under this invention, a reward point account may be opened and tracked (for awarding as well as redeeming points) for each of these two types of transactions so that a user may have two reward point accounts with a given merchant accordingly. The user may aggregate reward points from these accounts, either into each other or into an exchange account as described above, if desired.

In a further embodiment of this invention, a methodology referred to herein as cluster marketing is employed. A cluster may be defined by a group of partner merchants that are related in virtually any manner as defined by the cluster. For example, an entertainment cluster may be defined by a pizzeria, a video rental store, an ice cream shop, a movie theater, and a music store. The cluster may exist in a given geographic location such as a strip mall, a town, or it may be extended into larger regions or across the country, etc. Once a cluster is defined, each member will award their own branded loyalty reward points as described above (or branded with the cluster itself, if desired), and the acquiring bank server for each cluster partner will maintain user reward accounts based on purchases made by a user with his credit card at that location.

Agreements will exist between the cluster members that will define, via a set of rules stored in a database in the system, how points may be awarded and/or redeemed by members within the cluster. For example, cluster members may simply agree to honor each other's reward points at redemption. In this case, cluster member A will award its own loyalty points, and cluster member B will award its own loyalty points. When a user makes a purchase at cluster member B, he may redeem his cluster member A points as well as his cluster member B points. Each merchant in a cluster will have access to the reward point records of every other member in the cluster for this purpose (i.e. through the credit card network or a central exchange server). If he tries to redeem points at cluster member A or B that were issued by a merchant that is not a member of that cluster, he would be denied redemption. For example, a pizzeria, ice cream shop, and video store located in the same strip mall may agree to form a cluster and redeem each other's reward points, but no one else's reward points. This rule would be generated and stored in the database so that the system could check to see if an attempted redemption is allowed by the rule. This will provide an incentive to users to shop at these merchants in the same strip mall since they can use reward points at any such merchant, rather than going to a different merchant in a different mall where points would not be interchangeable at redemption. These cluster rules could be easily modified as desired as merchants enter and exit the cluster.

A reward points exchange account relevant to the cluster may also be created for each user and maintained by the credit card network, an independent entity, an acquiring bank, or an issuing bank as described above. In this embodiment, only loyalty reward points from cluster partners may be aggregated with each other into the reward points exchange server aggregation account. Thus, the user may aggregate his loyalty points from his pizzeria account, his ice cream store account, and his movie theater account, since they are partners in the same cluster. They may or may not carry the same par value. He may then make a redemption purchase from any of the cluster partners and utilize his aggregated reward points to pay for the item in whole or in part. (He may also use his reward points from one cluster partner to pay for products from another cluster partner, even if not aggregated on the exchange account, as described above).

By implementing a cluster partner methodology as described, each cluster partner may advertise the existence of the cluster and the partners involved, which will help each partner drive business within the cluster for the purchase of a given product or service. That is, if a consumer is a member of a given cluster, he is more likely to use the products and services of other members of that cluster in order to build his aggregated loyalty reward points quicker than if he used merchants not in that cluster. Thus, although each cluster partner has gained an advantage by offering his own branded loyalty points as previously unavailable in the prior art, each partner has also benefited from the marketing powers of his cluster partners to drive business within the cluster.

As mentioned above, clusters may be defined in any way by the system. A cluster may be defined by business groups such as an attorney cluster. This type of cluster may include merchants commonly used by an attorney, such as an office products supplier, an accountant, a legal research firm, etc. A homemaker cluster may be defined by a supermarket, a dry cleaners, a bank, a florist, and a hairdresser, etc. Likewise, a cluster may be defined by similar merchants across various regions. For example, a limousine cluster may be defined by a group of independent limousine operators across the country (e.g. all services that operate at an airport) so that a traveler may be have incentive to use only those services when he travels, gaining the benefits of increased loyalty points aggregation by using those services.

The system in this embodiment will thus include many clusters, and some merchants may in fact be members of different clusters if permitted by the member agreements. Groups of clusters may also form marketing agreements amongst themselves to allow points aggregation amongst clusters.

In a further embodiment of the invention, the system may operate to include certain types of businesses in an exclusive manner. For example, the system may be adapted to include only one pharmacy chain store, such as WALGREENS, as part of the loyalty network. In this case, WALGREENS would be the only pharmacy store that would issue branded loyalty points that could be aggregated with other loyalty points as described above, both within as well as outside a cluster. The system may also be adapted to allow other smaller pharmacies to operate in the loyalty point scheme if desired.

A merchant may choose to opt out of the system redemption process and accept points only that it previously awarded. Although this invention has been described with respect to a credit card network, other types of networks and infrastructures may be used as well. For example, a global communications network such as the Internet may be used, as well as a wireless network and an interactive television network.

In the alternative to utilizing the acquiring bank for storing individual merchant reward point accounts as well as aggregated reward point accounts, a central server may be used for this function as shown in FIG. 12. That is, a centralized functionality may be used, such as a credit card network administrator or operator, to perform the functions of the present invention. In this case, the merchant computers and/or the acquiring banks would communicate via the network (or via an external network such as the Internet) with the central server to instruct the central server to store reward points, redeem reward points, and aggregate reward points, in the same manner as with the acquiring bank described above. By centralizing the reward point account functions, advantages may be realized such as scalability, economies of scale, etc.

For example, a central server may reside on the credit card network and track the transactions between the merchant, the acquiring bank, and/or the issuing bank. A reward account is maintained on the central server on behalf of the merchant and the user, and the number of reward points in the user's account for that merchant is increased accordingly. There may be a setup fee charged by the central server to initiate the loyalty program for a merchant, as well as transaction fees that provide for a small percentage of revenue to the central server for each transaction made by the central server. Preferably, the user is able to view his loyalty point account balances and aggregate reward points as described above by logging into a web site run by the central server.

In a further embodiment, a third party operates on behalf of an acquiring bank in several aspects, including but not limited to the logging, tracking and storage of reward points on behalf of a merchant and user. In this embodiment, a third party may acquire the business and/or act on behalf of an acquiring bank, in particular by managing and settling transactions between the acquiring bank and other member banks, such as issuing banks. Similarly, the third part may be acting as an intermediary between the acquiring bank and other member banks. As part of its functions performed on behalf of the acquiring bank, the third party sets up reward points accounts in the same manner as the acquiring bank does in the preferred embodiment. Since the third party is managing transactions over the credit card network on behalf of the acquiring bank, the third party will have the information that it needs in order to award and/or redeem reward points for each transaction.

Thus, on request of the acquiring bank, the third party would open an account that logs the reward points that are awarded to a user for a transaction with that merchant as described with respect to the preferred embodiment. This may be a simple instruction filed that is part of the credit card transaction information passed to the third party from the acquiring bank, or it may be a separate instruction, etc. In any event, the third party would keep track of the reward points for that merchant and their customers, adding to the account as purchases are made. In the event that the reward points are requested to be redeemed or aggregated, the third party would interact with the appropriate parties in the same manner as the acquiring bank in the preferred embodiment.

Figure 13:
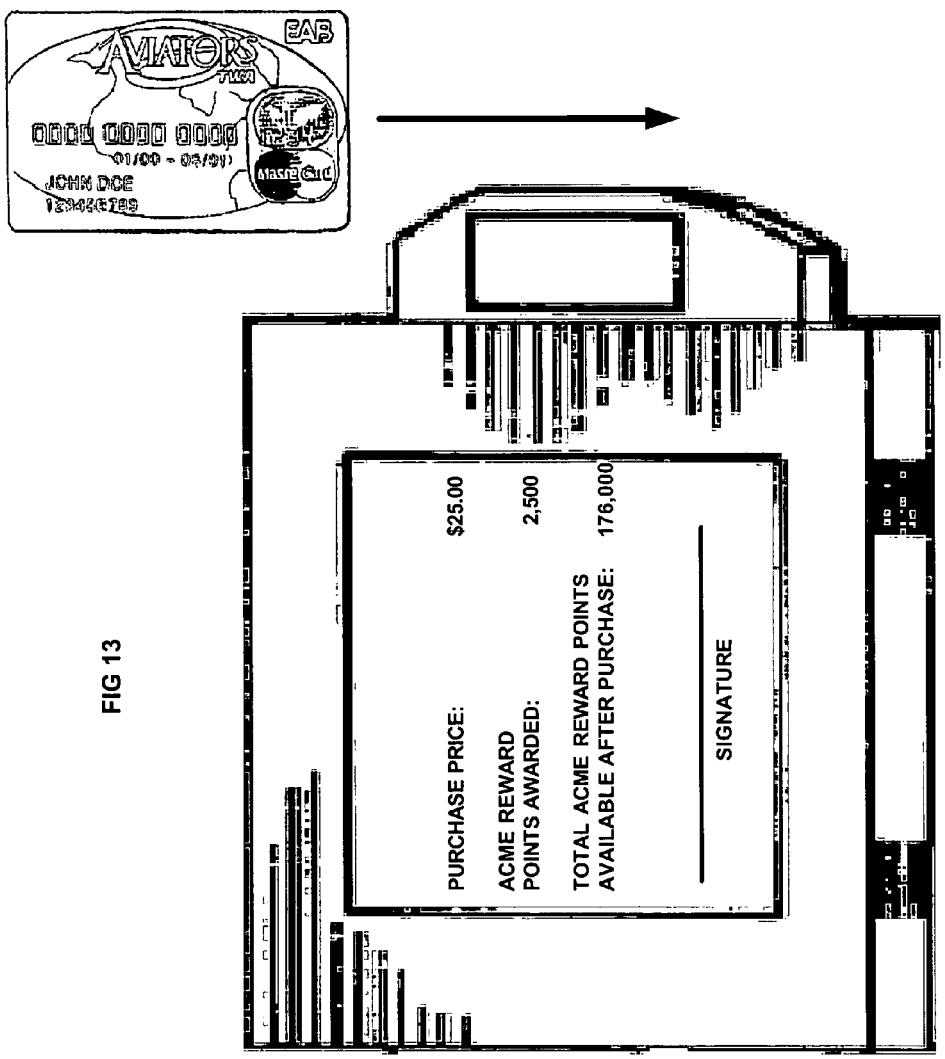
FIG. 13 illustrates a touchscreen POS device used with this invention.

The point of sale (POS) terminal for the present invention will now be described. In the preferred embodiment, the purchaser uses a credit card as a token for accessing the system; i.e. for obtaining reward points for a purchase transaction with a merchant and for redeeming reward points during a redemption purchase transaction with the merchant. When the purchaser visits a physical location such as a store for making a purchase transaction, he will present his credit card as in a regular credit card transaction. In one case, the POS terminal will be located on the counter so that the purchaser can swipe the credit card through the magnetic stripe reader in the open slot, and the POS terminal will read the credit card information, which will identify the issuing bank as well as the account number of the purchaser. An example of this device is shown in FIG. 13. A message will be sent to the merchant's acquiring bank, which will include the credit card information as well as the merchant identification and the amount of the purchase (i.e. the credit requested for authorization). The message may also include an instruction for the acquiring bank to award reward points to the purchaser related to the amount of the purchase, assuming it is approved and executed. For example, the POS may be adapted to instruct the acquiring bank to award one point for each dollar in a given transaction, so a $100 purchase would result in the acquiring bank logging 100 reward points in the account associated with that merchant and that purchaser, as identified in the message sent to the acquiring bank from the merchant POS terminal.

The POS terminal will have a display (e.g. a touchscreen) that typically shows the purchaser the amount of the purchase, and a line for a signature to be entered by the purchaser once the transaction has been authorized by the issuing bank. The display will also show the purchaser how many points that have been awarded as a result of the transaction, and it may optionally show the total number of points in the purchaser's account with that merchant (in this case, the total would be sent back from the acquiring bank to the merchant POS as part of the authorization message). Other information regarding the reward point system may also be displayed, such as "Purchase a CD next weekend and get double points!", or the like. Optionally, the number of points may also be printed on the receipt that is printed by the POS terminal and given to the purchaser.

In the case where a reward rules-based scenario is implemented to award reward points automatically based on predetermined rules stored in a database (for example at the acquiring bank), then there is no requirement for a specific instruction for awarding reward points to be sent as part of the credit card transaction. As described above, the transaction information (purchase price, item identification, purchaser identification, merchant identification) will be passed on to the acquiring bank, and the acquiring bank will use that information along with the rules database to determine if reward points should be awarded, how many points, etc. based on the rules previously established.

In a further embodiment wherein a cluster of merchants has been formed as described above, the acquiring bank may send information regarding some or all of the cluster merchants and the purchaser's respective reward accounts for each merchant, and the POS terminal will display this cluster information similarly to the case above with the single merchant. Thus, for example, the POS terminal display may indicate how many reward points the purchaser has in each of several cluster merchants as follows:

Your BLOCKBUSTER account has 3,750 points

Your CIRCUIT CITY account has 4,654 points

Your FRIENDLY's account has 285 points

This may also be printed on the receipt for convenience of the user.

In the case where the merchant's acquiring bank stores all of the reward accounts for the merchants in the cluster (i.e. all of the merchants in the cluster use the services of the same acquiring bank), then it is relatively straightforward for that acquiring bank to provide all of the merchants' reward point data for that purchaser to the POS terminal for display as described. There may be instances, however, wherein it is desired to display reward point account data from merchants that use a different acquiring bank. In these cases, then the different acquiring banks communicate with each other, such as over the credit card network, to provide the required reward point data to each other for display to the purchaser.

In a further embodiment, the purchaser may have an aggregation exchange account at the acquiring bank (or elsewhere), and the aggregated reward point totals may be sent to the POS terminal for display and/or printing in addition to the individual reward point accounts. In the case where the acquiring bank does not store the aggregated reward point account, then the acquiring bank may issue a request to the appropriate server to obtain this information accordingly.

When a purchaser wishes to make a redemption transaction, he will present the credit card to the terminal and press a button (or an area of the touchscreen) that will indicate that he wishes to utilize reward points to pay for some or all of the purchase price of the item. Assuming that the purchaser indicated he will pay the entire price with points, the terminal will send an instruction to the acquiring bank indicating this, and assuming that the reward account for that merchant and purchaser has ample points in it, then the account will be reduced by the number of points required for the transaction. The number of points required may either be directly communicated to the acquiring bank (e.g. 4,000 points for a $40 purchase), or there may be a set of redemption rules stored at the acquiring bank that instructs the acquiring bank how many points to use for that purchase. This is similar to the reward rules described above. In any event, the number of points used for the purchase will be displayed and printed, as well as the remaining reward point balance after the transaction is completed.

The purchaser may also be given the option to use only some points for redemption. The purchaser will enter the number of points to be used (e.g. after a reward account total is displayed to him) into the POS terminal, and the terminal will proceed to calculate the adjusted purchase price after the reward points have been accounted for. So, for example, if the user indicates that he wants to redeem 1,500 points to reduce the purchase price from $40.00 to $25.00, then the credit card transaction will proceed in the amount of $25.00.

The POS terminal interface may also be adapted to provide the purchaser the option to effect a purchase transaction with reward points (from the merchant account, a related cluster merchant account, and/or or aggregated points), even if the purchaser had not originally intended for the transaction to be a redemption purchase transaction (i.e. use reward points). In this case, once a purchaser has presented the credit card to the terminal and the acquiring bank is informed from the merchant of the purchase price that is requested to be authorized, the acquiring bank may first look up the reward points for that user that may be available for redemption (e.g. if certain redemption rules are met as explained above) and then inform the merchant terminal of the points available. The terminal display would then display a message asking the purchaser if he would like to make the purchase with points or a combination of points and other consideration ("You have 24,342 points available for use in this purchase. How many would you like to use?"). The purchaser can elect not to use reward points and instead pay the full purchase price (thus possibly earning him reward points into his account), or he can elect to pay in full with reward points (if enough are available), or he can elect to reduce the purchase price by redeeming some of his points against the purchase price. After the purchaser has made his election, the acquiring bank takes the appropriate steps (i.e. reduce the point account totals, request credit authorization for a reduced price, or a full price, etc.)

In a further embodiment, a smart card may be used as the token with the present invention. A smart card, which has an integrated circuit(s) and associated memory circuits located on the card, as well as input/output contacts, allows for various applications and data to be easily stored, revised, and managed via a smart card terminal. The smart card terminal will be located at a POS as with the credit card terminal described above. In one embodiment, the reward point information obtained by the POS terminal as part of the purchase transaction may be transferred onto the smart card memory so that the purchaser will have updated reward point information stored on the card. That is, when the user enters the smart card into the reader at the merchant POS, the transaction will proceed as described above, and in addition, the smart card terminal will load the reward point account information into the card's memory. The purchaser may then user the smart card at another reader, such as one associated with his personal computer at home, and read out the reward point account information there as well.

This may be used strictly for informational purposes, or it may be used to effect subsequent transactions. For example, in the event that a purchaser has the smart card terminal connected to his PC, he may barter with other entities over the Internet and utilize his points for purchases, trade points, etc. Once his account totals are updated on his card, he can have the updated totals read out the next time he visits the merchant, and the updated totals will be used to revise the account totals at the acquiring bank server accordingly.

In addition to using a credit card or smart card terminal at the merchant's point of sale as described above, it is increasingly popular to implement online purchases, for example with a web site over the Internet. In this case, the user would enter the appropriate credit card number onto a web page (or scan the card with a terminal connected to this PC), and the process would proceed as described above with respect to the merchant POS terminal. Likewise, reward points may be awarded and/or redeemed via telephone as known in the prior art. Other hardware embodiments such as PDA's, cell phones etc. may also be used with the present invention for awarding and redeeming points as described herein.

The present invention enables acquiring banks to setup and manage reward points accounts on behalf of merchants and their customers. In one embodiment, this invention provides for new customer acquisition for a bank that operates as both an acquiring bank and an issuing bank, as now described. When a purchaser has registered as part of the loyalty system herein, the acquiring bank will have information regarding his name, address, etc. When the purchaser uses a credit card to make a purchase as part of the loyalty system herein, data is captured regarding the purchaser. That information may be utilized by the acquiring/issuing bank in order to attempt to obtain his credit card business, for example by preparing and sending him a credit card issued by the acquiring/issuing bank. This acts therefore as a new customer acquisition methodology that will enable acquiring/issuing banks to acquire new customers as a result of using the system of the present invention.

In a further embodiment, a user may be able to transfer reward points from one of his merchant accounts to another user's account as a gift (or for some consideration), and that user will enjoy the benefits of those reward points as if he had earned them himself.

Further details of reward point aggregation will now be described. Reward points aggregation is described in full detail in U.S. Pat. No. 6,594,640, owned by the assignee of the present invention, which is incorporated by reference herein. As described in the '640 patent, and with reference to FIG. 4, a plurality of reward server computers 10, 12, 14, a trading server 20, a merchant computer 30 and a user computer 40 are shown in communication with a network 40. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as offered by American Express where the user earns rewards based on purchases or an advertising based award program where the user earns rewards by selecting advertising content.

Figure 1:
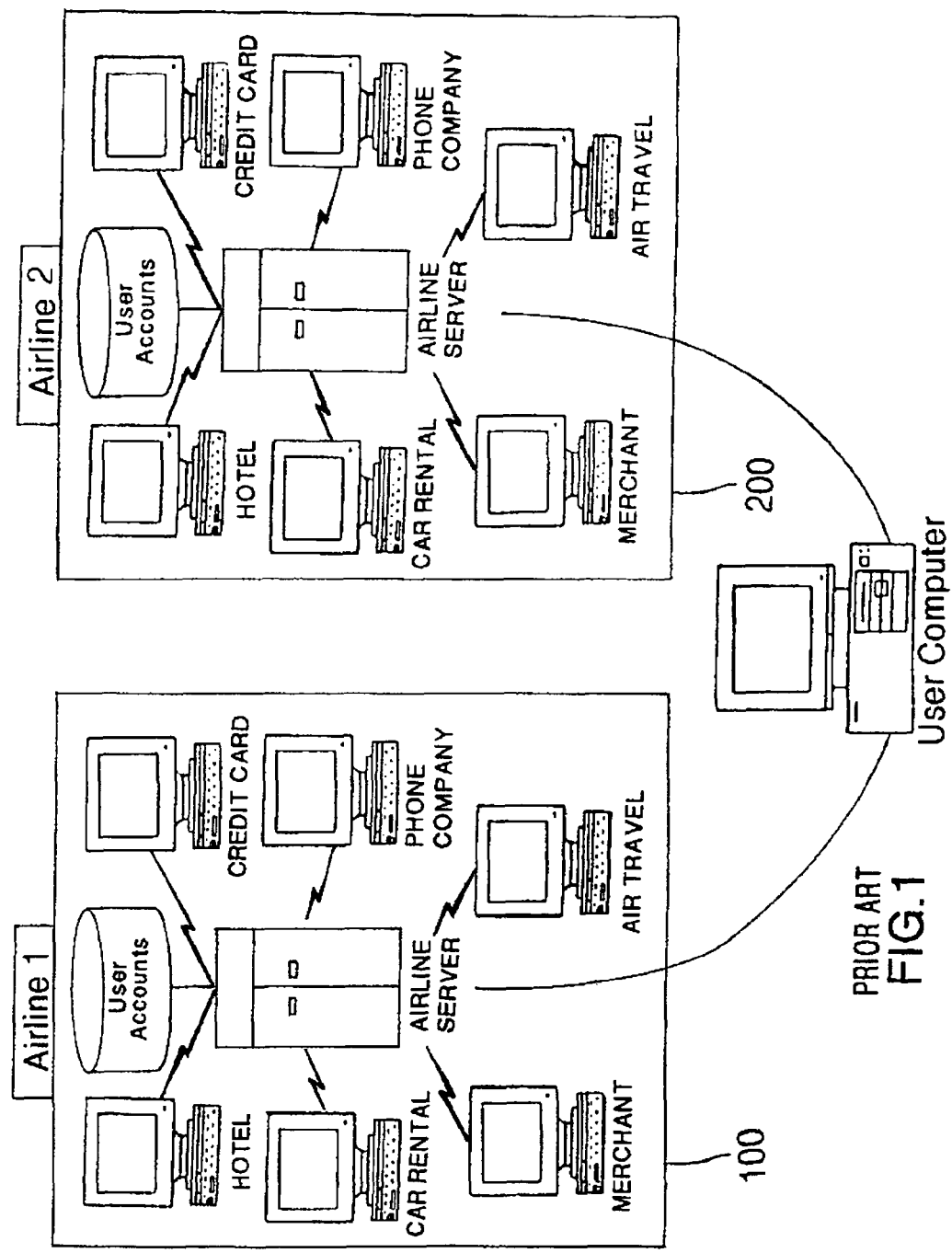
FIG. 1 is representative of the prior art marketing arrangements used in reward programs.

A user of this system may acquire and accumulate rewards through any prior art means such as shown on FIG. 1, which are then posted in a user's reward account 52 that is accessible through the reward server computer 10. The trading server computer 20 is in communication through the network 2 with a user on a user computer 40 and is additionally able to connect to the reward server computers 10, 12, 14 through the network 2 in accordance with techniques well known in the art for Internet communications. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions. The reward server computers 10,12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may freely navigate to any site by means well known in the art.

The present invention allows issuers who originally sold reward points in their program for use as an incentive by third parties to repurchase points at a substantial discount, thereby reducing their liability and allowing for a trading strategy that enables points to continually be sold and repurchased. This may be a separate accounting procedure than what is used for points that are granted.

Figure 4:
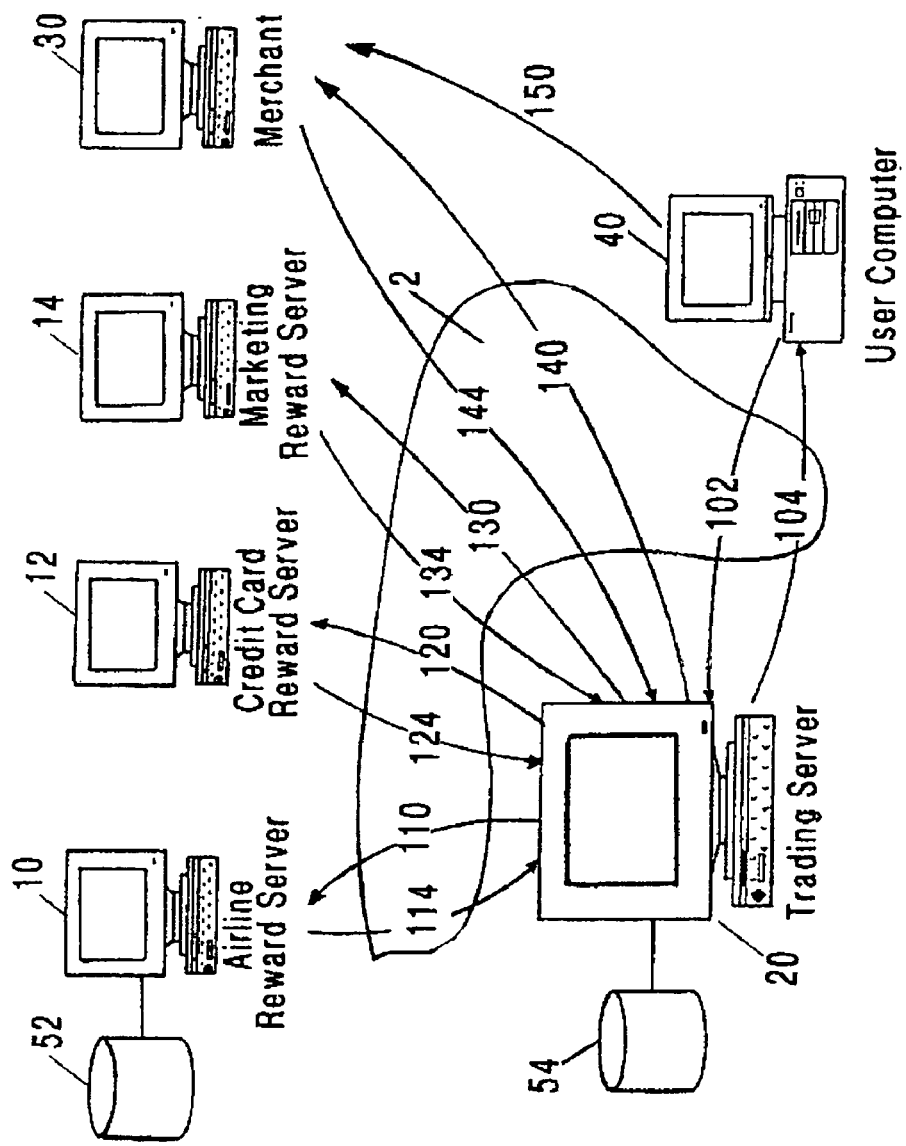
FIG. 4 is a block diagram of the components of the present invention.
Figure 5:
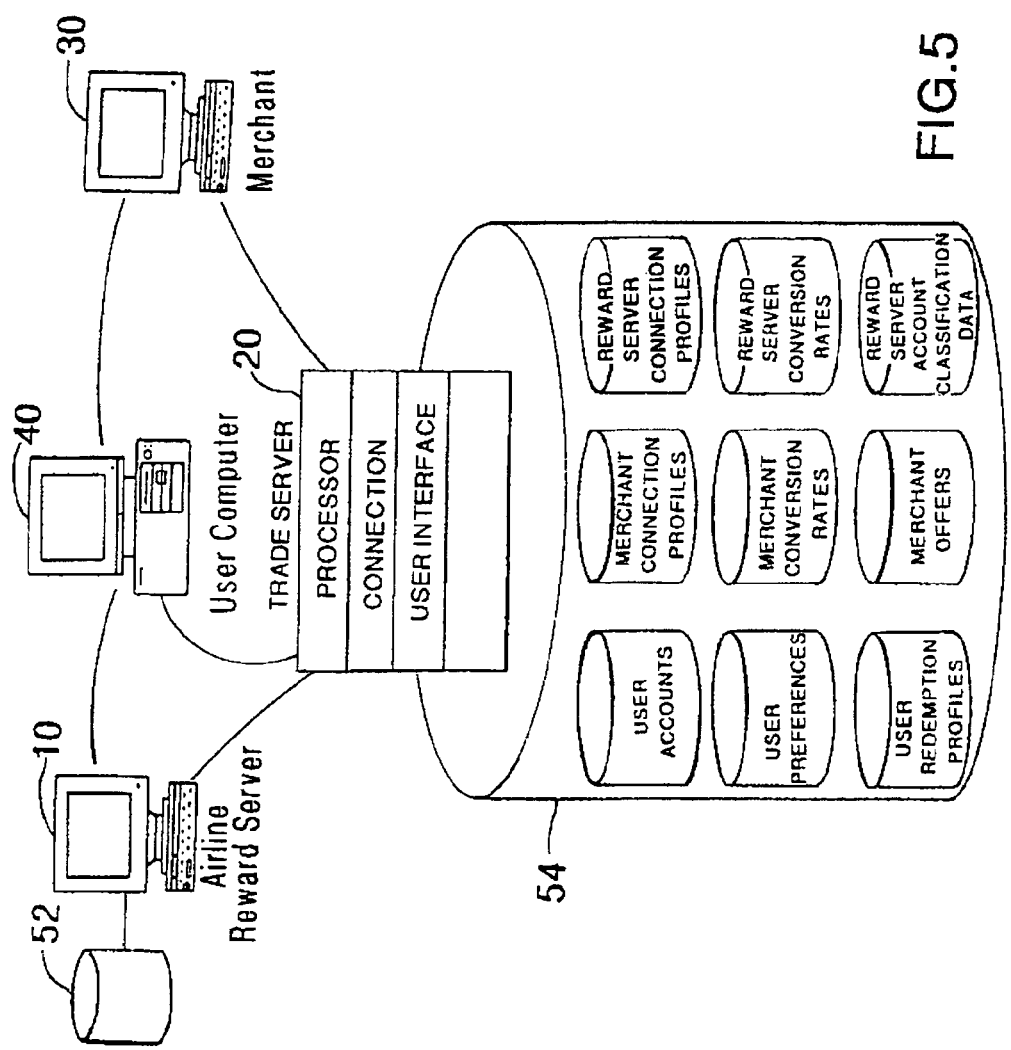
FIG. 5 is a block diagram of the system components of the present invention.
Figure 6:
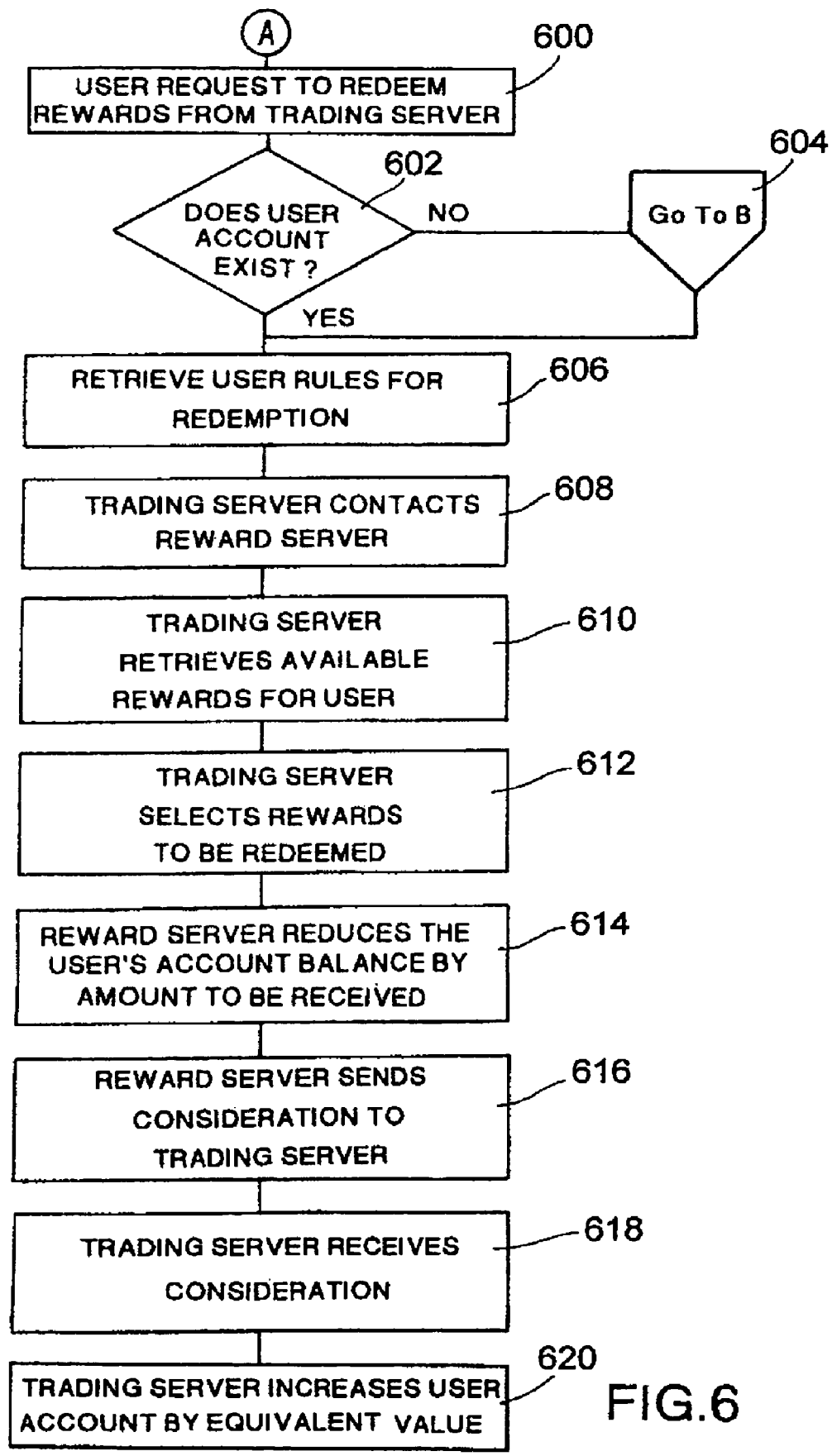
FIG. 6 is a data flow diagram of the process for a user to redeem rewards.

The method of allowing the user to redeem the accumulated reward points from one or more of a plurality of reward entities will now be described with respect to FIG. 4 and the data flow diagram of FIG. 6. The trading server system would allow users to "log in" to access the functionality provided where the user may interact with applications, forms or controls. For example, the user may view his account information by using a web browser to enter the appropriate identification information and then select buttons, links or other selectable objects to navigate to the part of the system desired. The user, from the user computer, makes a request to the trading server computer 20 at step 102, requesting redemption through the network 2 for a portion of the pre-accumulated reward points stored for the user in one of the rewarding entities. A user reward account 52 is associated with each of the reward servers but is only shown in FIG. 4 connected to the airline server for sake of clarity. The user may interactively select rewards to be redeemed, or the system may determine which rewards are to be redeemed based on a previously defined user profile rule. The trading server computer 20 "obtains" the reward points from a reward server 10, 12, 14 stored in the user's account 52 by contacting the appropriate reward server at step 110 according to the user's requirements, by using the connection parameters as defined in a database 54 on the trading server as shown in FIG. 5. In one embodiment, the trading server retrieves reward account balance information at step 114 from the reward server for the user. In another embodiment, the trading server transfers as part of the communication 110, the requested reward mileage to be redeemed. The reward server computer 10 decreases the users reward account 52 by the requested number of reward points. The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10. For example, the consideration may be in the form of a monetary credit to an account that exists between the trading server and the reward server, that gets paid at the end of a predefined billing cycle (i.e. every month). The trading server computer 20 increases the reward exchange account 54 associated with the user by the received number of points. The trading server computer 20 in turn, receives the consideration from the reward server computer 10.

Figure 7:
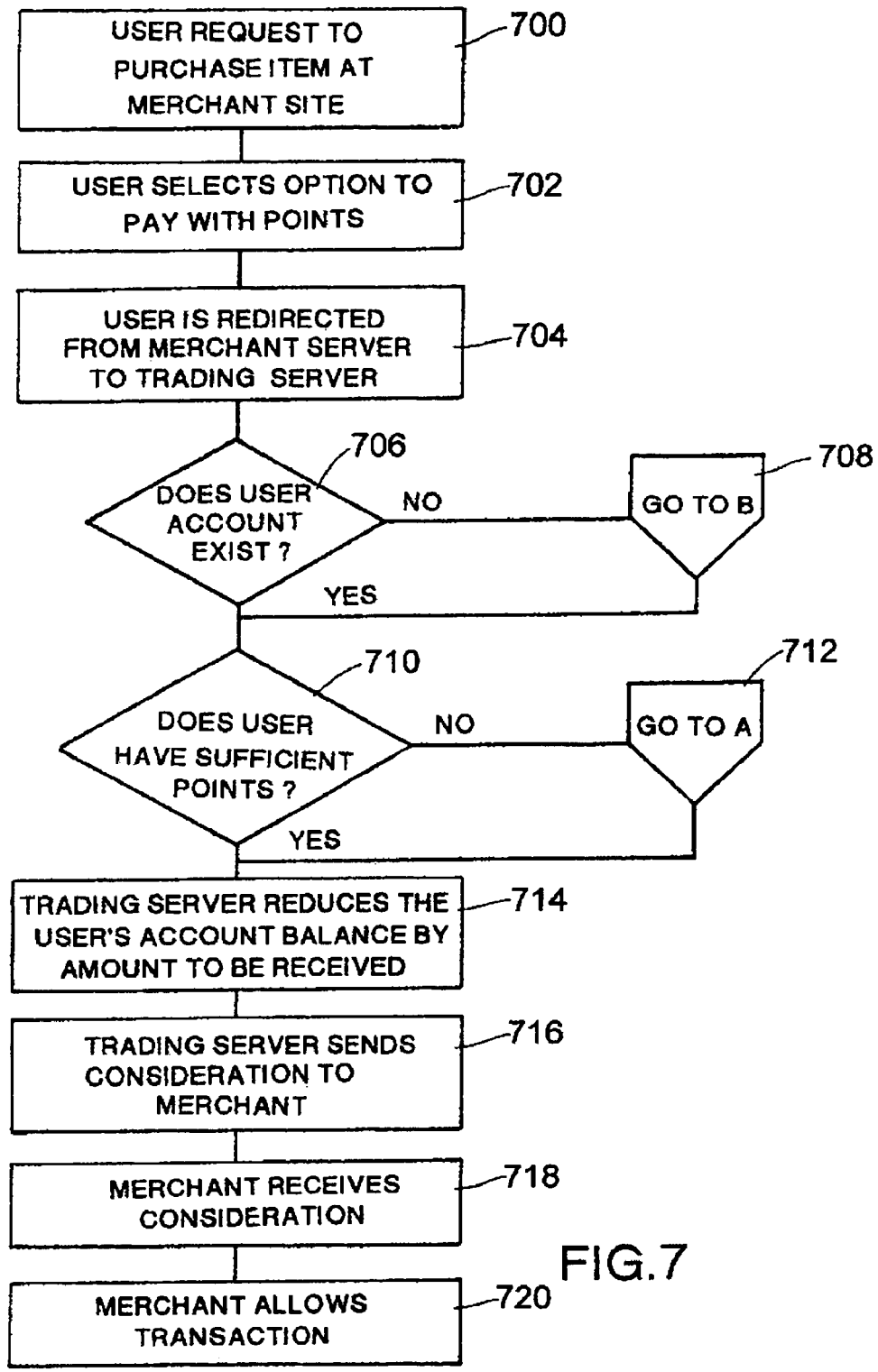
FIG. 7 is a data flow diagram of the user request for purchase of an item at a merchant site.

In the second part of the transaction (see FIG. 7), the user from a user computer 40 may make a request 150 to purchase an item from an associated merchant computer 30. In the preferred embodiment, the merchant computer system will be a networked computer system accessible via the Internet. The user would visit the site by selecting on a link from the trading server's web site or by entering the name or address of the destination site. The user may identify one or many items to be acquired from one or several merchants 30. The trading server computer 20 would confirm that the user has sufficient points to purchase the selected item by checking the user's reward exchange account 54. The trading server computer 20 would request the merchant computer to deliver the item to the user. The user delivery information may be retrieved from the trading server computer 20 or may be supplied in some other manner. The trading server computer 20 would decrease the user exchange account 54 by the number of points corresponding to the purchased item. The trading server computer 20 conveys consideration to the merchant computer 30 equivalent to the cost of the item by means well known in the art of electronic commerce (eg. by a preexisting account, credit card, etc.) In the alternative, the consideration may be a direct transfer of points to an account associated with the merchant.

Policies and profiles may be established to automatically contact each of the reward servers according to a user redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process where the user may select how the transaction should proceed. If the user exhausts lower personal worth resources from the reward servers, the system may be required to contact the user before the transaction is allowed to proceed to redeem points. A classification system may also be used to indicate rewards of similar worth. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted.

FIG. 8 describes the process steps involved in enrolling a user to utilize the trader server. The data entered by the user may be used in determining whether a user allows unsolicited offers to be presented from the trading server. The user's preferences for manufactured goods services, products, travel destinations, hobbies, interests or any other user entered criteria may be stored in the database for subsequent use by the system. The trading server has the ability to receive offers from reward servers or merchants which may then be directed to users based on the database profile information provided by the user (see FIG. 9).

The trading server may also be contacted in response to a button or hyperlink located on a web page accessible by the user from the airline reward server. In a similar manner, hyperlinks or calling routines may allow a user to access a reservations system or merchant from the trading server. The link would direct the user to partner or associated air carriers where the points in a user exchange account on the trading server 20 may be used to acquire reduced fare flights.

The system used to implement the aforementioned method will now be disclosed with respect to FIG. 5. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules specified by the user, system, or merchant. The trading server also has communications means to allow users to access the server and to allow the trading server to contact reward servers and processing means to interpret the rules and coordinate the contact to the respective reward servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants.

In the preferred embodiment, the memory means comprises a database structure that is used to record the transactions associated with the previously described method. Records indicating the changes and current value of user exchange accounts are updated according to the request processed by the processor.

In response to a request for redemption, the trading server looks up the contact properties of the reward server to be contacted. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action. In another embodiment, the trading server processor may be granted direct authorization to modify the user's records in the reward server database without analysis by the processor of the reward server. A conversion rate may be applied to the transaction such that the reward server reduces the available rewards in the user's account. The reward server then transfers consideration to the trading server that corresponds to the value reduced in the reward system. In response to the receipt of the transfer or approval of the transfer, the trading server increments the user account balance to reflect the received consideration and the connection to the reward server is dropped. A transaction log may be used to record each of the transactions in case a reconciliation process is required at a later time. The increase in the user's exchange account may then be stored until a user finds an item to be purchased.

The user selects the desired object from the merchants by indicating the type of product or service to be procured. In one embodiment, the trading server contacts the merchant server to return to the user a list of products that match the user's search criteria or if the user had specified in detail what was desired, the product may be directly acquired from a merchant. A communication link is established between the trading server and the merchant computer or designee for e-commerce. Direct acquisition may be enacted by contacting the merchant computer and supplying the user indicia, the product indicia, and the redemption value sufficient to secure the transaction. In response to the transaction request, the merchant computer will receive the consideration supplied and contract for the delivery of the product. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

Thus, the present invention provides a liability management system for issuers of reward points, which allows them to take points off the books and eliminate them, if desired, at a discount rate. This system enables the sale or repurchase of points with a trading strategy in which points need not expire.

The present system may be implemented by means of a smart card wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a vender associated with a computer connected to the Internet. The trading process proceeds as described above, except that the points are obtained directly from the smart rather than a reward server.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card is linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

The user can purchase points from the system, borrow points from the system, etc., and basically treat the points as cash consideration for purposes of such transactions.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected.

It is anticipated that high quality limited access products may benefit from the distribution methods afforded by this system. For example, companies like DeBeers and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets can have an associated diminishing or escalating value based on the length of the offer.

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

Other purchasing leverage not specifically addressed previously may also be acquired by combining the power of a pool of high profile users of this system where these users may be allocated access to products or services not generally distributed to the remainder of the system users. Points collected in the system by these users may afford them access to limited distribution channels where higher discount levels or premium luxury products may be acquired. Direct access to cartel products such as diamonds, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games may be afforded to the traveler where the availability of different games depends on the number of reward points traded in by the traveler. The rewards may be converted using the trading server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use.

In another aspect of the invention, an electronic bartering system is implemented, wherein product manufacturers, producers, distributors, etc. can provide surplus or overstocked goods for liquidation into the chain of supply of the system and exchange then for points as described herein. This provides an inventory management and liquidation system for these manufacturers and sellers.

In addition, the value of the reward points may fluctuate as a function of the company's performance, which may be measured by reference to the price of its stock, revenue, earnings, or some other parameter that is agreed to that reflects the relative performance of the company. In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the number of points otherwise earned by using its credit card. The value may also fluctuate as a function of the number of points outstanding or the desirability of the issuer to reduce its liability or make it more robust.

I claim:

1. A method of operating a reward points program in conjunction with a network, the network interconnecting with a plurality of merchant computers and an acquiring bank computer that processes payment card transactions with a plurality of users on behalf of the plurality of merchant computers, each of said merchant computers associated with a merchant and the acquiring bank computer associated with an acquiring bank, the method comprising:
   a. providing, at the acquiring bank computer, a reward point account database that stores a plurality of reward point accounts, each of said reward point accounts associated with a unique combination of a user and a merchant for tracking reward points earned by the user associated with that reward point account for transactions with the merchant associated with that reward point account, wherein all reward point accounts associated with a particular user are accessible with a user ID of a payment card associated with that particular user regardless of which merchant is associated with that reward point account,
   b. a user executing a purchase transaction with a transacting merchant computer selected from the plurality of merchant computers by presenting a payment card for use by the transacting merchant computer for payment of at least part of the purchase transaction;
   c. the transacting merchant computer transmitting via the computer network a transaction request to the acquiring bank computer, the transaction request comprising a user ID as obtained from the payment card and a payment approval request for the purchase transaction;
   d. the acquiring bank computer adding reward points to the reward point account in the reward point account database that is associated with the user identified by the user ID and the transacting merchant;
   e. establishing on the reward point account database a reward point exchange account associated with a user;
   f. selecting reward points from each of a plurality of reward point accounts associated with the user for exchange into the reward point exchange account; and
   g. aggregating the selected reward points into the reward point exchange account.

2. The method of claim 1 wherein the transacting merchant computer transmits, as part of the transaction request, an instruction to the acquiring bank computer to add reward points to the reward point account associated with the transacting merchant and the user.

3. The method of claim 1 wherein the acquiring bank computer automatically adds reward points to the reward point account associated with the transacting merchant and the user based on a previously defined rule.

4. The method of claim 3 wherein the previously defined rule provides for the acquiring bank computer to automatically add reward points to the reward point account associated with the transacting merchant and the user based on an item purchased by the user.

5. The method of claim 3 wherein the previously defined rule provides for the acquiring bank computer to automatically add reward points to the reward point account associated with the transacting merchant and the user based on a purchase price of an item purchased by the user.

6. The method of claim 3 wherein the previously defined rule provides for the acquiring bank computer to automatically add reward points to the reward point account associated with the transacting merchant and the user based on the geographic location of the transacting merchant.

7. The method of claim 3 wherein the previously defined rule provides for the acquiring bank computer to automatically add reward points to the reward point account associated with the transacting merchant and the user based on the date of the purchase transaction.

8. The method of claim 3 wherein the previously defined rule provides for the acquiring bank computer to automatically add reward points to the reward point account associated with the transacting merchant and the user based on the time of day of the purchase transaction.

9. The method of claim 1 further comprising establishing a cluster of participating merchants, each of which have reward point accounts established with the reward point account database.

10. The method of claim 9 further comprising allowing reward points from a reward point account associated with one of the participating merchants in the cluster to be redeemed with another participating merchant in the cluster.

11. The method of claim 10 further comprising disallowing reward points from a reward point account associated with a merchant that is not a participating merchant in the cluster to be redeemed with a participating merchant in the cluster.

12. The method of claim 9 wherein the participating merchants in the cluster sell different types of goods and services from each other.

13. The method of claim 9 wherein the participating merchants in the cluster sell the same type of goods and services as each other.

14. The method of claim 9 wherein the participating merchants in the cluster are in the same geographic region.

15. The method of claim 1 further comprising the user redeeming aggregated reward points from the user's reward point exchange account by
    the user executing a redemption purchase transaction with a merchant computer;
    the user indicating to the merchant computer that aggregated reward points from the reward point exchange account should be utilized for the redemption purchase transaction; and
    the reward point exchange account being reduced by the number of aggregated reward points utilized for the redemption purchase transaction.

16. The method of claim 1 further comprising:
    establishing a cluster of participating merchants, each of which have reward point accounts established on the reward point account database;
    allowing aggregation of reward points from each of the participating merchants in the cluster into the user's reward point exchange account; and
    disallowing aggregation of points from a merchant which is not a member of the cluster.

17. The method of claim 16 further comprising allowing for redemption of aggregated reward points only with merchants that are members of the cluster.

18. The method of claim 1 wherein the network is a global communications network.

19. The method of claim 18 wherein the global communications network is the Internet.

20. The method of claim 1 wherein the network is a wireless network.

21. The method of claim 1 wherein the network is an interactive television network.

22. The method of claim 1 wherein the user executes the purchase transaction at a physical point of sale associated with the merchant computer and the user physically presents the token to the merchant computer.

23. The method of claim 1 wherein the user executes the purchase transaction via a web site associated with the merchant computer, and the user enters the user ID associated with the payment card to the web site.

24. A reward points system comprising a plurality of merchant computers interconnected over a network with an acquiring bank computer for processing payment card transactions with a plurality of users on behalf of the plurality of merchant computers, wherein each of the merchant computers is associated with a merchant and is programmed to:
    execute a purchase transaction with a user who presents a payment card for payment of at least part of the purchase transaction; and
    transmit a transaction request to the acquiring bank computer via the network, the transaction request comprising a user ID as obtained from the payment card and a payment approval request for the purchase transaction; and
    wherein the acquiring bank computer is associated with an acquiring bank and comprises a reward point account database that stores a plurality of reward point accounts, each of said reward point accounts associated with a unique combination of a user and a merchant for tracking reward points earned by the user associated with that reward point account for transactions with the merchant associated with that reward point account, wherein all reward point accounts associated with a particular user are accessible with a user ID of a payment card associated with that particular user regardless of which merchant is associated with that reward point account; and wherein the acquiring bank computer is programmed to add reward points to the reward point account in the reward point account database that is associated with the user identified by the user ID and the transacting merchant
    wherein the reward point account database further comprises a plurality of reward point exchange accounts, each reward point exchange account associated with a user; and wherein the acquiring bank computer is further programmed (i) to allow the selection of reward points from each of a plurality of reward point accounts associated with the user for exchange into the reward point exchange account, and (ii) to aggregate the selected reward points into the reward point exchange account.

25. The system of claim 24 wherein the transaction request further comprises an instruction to the acquiring bank computer to add reward points to the reward point account associated with the transacting merchant and the user.

26. The system of claim 24 wherein the acquiring bank computer is programmed to automatically add reward points to the reward point account associated with the transacting merchant and the user based on a previously defined rule.

27. The system of claim 26 wherein the previously defined rule provides for the acquiring bank computer to automatically add reward points to the reward point account associated with the transacting merchant and the user based on an item purchased by the user.

28. The system of claim 26 wherein the previously defined rule provides for the acquiring bank computer to automatically add reward points to the reward point account associated with the transacting merchant and the user based on a purchase price of an item purchased by the user.

29. The system of claim 26 wherein the previously defined rule provides for the acquiring bank computer to automatically add reward points to the reward point account associated with the transacting merchant and the user based on the geographic location of the transacting merchant.

30. The system of claim 26 wherein the previously defined rule provides for the acquiring bank computer to automatically add reward points to the reward point account associated with the transacting merchant and the user based on the date of the purchase transaction.

31. The system of claim 26 wherein the previously defined rule provides for the acquiring bank computer to automatically add reward points to the reward point account associated with the transacting merchant and the user based on the time of day of the purchase transaction.

32. The system of claim 24 in which a cluster of participating merchants is established, each of which have reward point accounts established with the reward point account database.

33. The system of claim 32 in which reward points from a reward point account associated with one of the participating merchants in the cluster may be redeemed with another participating merchant in the cluster.

34. The system of claim 33 in which reward points from a reward point account associated with a merchant that is not a participating merchant in the cluster may not be redeemed with a participating merchant in the cluster.

35. The system of claim 24 wherein the acquiring bank computer is further programmed to reduce the number of aggregated reward points in the reward point exchange account by a number of aggregated reward points utilized for a redemption purchase transaction with an associated merchant computer.

36. The system of claim 24 wherein a cluster of participating merchants are established, each of which have reward point accounts established on the reward point account database; and the acquiring bank computer is programmed to allow
reward points to be aggregated from each of the participating merchants in the cluster into the user's reward point exchange account; and to disallow
reward points to be aggregated from a merchant which is not a member of the cluster.

37. The system of claim 36 wherein aggregated reward points may be redeemed only with merchants that are members of the cluster.

38. The system of claim 24 wherein the network is a global communications network.

39. The system of claim 38 wherein the global communications network is the Internet.

40. The system of claim 24 wherein the network is a wireless network.

41. The system of claim 24 wherein the network is an interactive television network.

* * * * *